US008505957B2

(12) United States Patent
Bizzell et al.

(10) Patent No.: US 8,505,957 B2
(45) Date of Patent: Aug. 13, 2013

(54) STROLLER WITH MULTIPLE CONFIGURATIONS

(75) Inventors: Daniel Lee Bizzell, Davidson, NC (US); Ian D. Kovacevich, Charlotte, NC (US); Thomas James Philpott, Charlotte, NC (US); Kevin J. Dahlquist, Charlotte, NC (US); Lynn Furton McIntyre, Huntersville, NC (US); Karen Jacy Madigan, Huntersville, NC (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

(21) Appl. No.: 13/416,184

(22) Filed: Mar. 9, 2012

(65) Prior Publication Data
US 2012/0169030 A1 Jul. 5, 2012

Related U.S. Application Data

(63) Continuation of application No. 12/274,272, filed on Nov. 19, 2008, now abandoned.

(60) Provisional application No. 60/989,111, filed on Nov. 19, 2007, provisional application No. 61/025,717, filed on Feb. 1, 2008.

(51) Int. Cl.
*B62B 7/00* (2006.01)

(52) U.S. Cl.
USPC .......................... 280/642; 280/647; 280/648

(58) Field of Classification Search
USPC ................. 280/642, 643, 647, 650, 657, 658, 280/47.25, 47.38, 47.39, 47.4
See application file for complete search history.

(56) References Cited

U.S. PATENT DOCUMENTS

| 63,541 | A | 4/1867 | Madison |
| 139,838 | A | 6/1873 | Dervort et al. |
| 203,582 | A | 5/1878 | Borchardt |
| 247,162 | A | 9/1881 | Burton |
| 270,561 | A | 1/1883 | Wood |
| 315,165 | A | 4/1885 | Post |
| 425,612 | A | 4/1890 | Johnson et al. |
| 584,169 | A | 6/1897 | Stock |
| 618,337 | A | 1/1899 | Duffner |
| 630,422 | A | 8/1899 | Stock |
| 732,426 | A | 6/1903 | Murray |
| 915,149 | A | 3/1909 | Zajac |

(Continued)

OTHER PUBLICATIONS

Information Disclosure Statement (IDS) Letter Regarding Common Patent Application(s), dated May 25, 2012.

*Primary Examiner* — Katy M Ebner
(74) *Attorney, Agent, or Firm* — Tillman Wright, PLLC; James D. Wright; David R. Higgins

(57) ABSTRACT

A stroller for carrying a child in a plurality of configurations includes a frame having a frame base defining a forward-facing direction and a rearward-facing direction and at least two side members attached at opposite sides of the frame base. The stroller further includes a plurality of wheels connected to the frame and a seat arranged generally above a platform attached to the frame and configured for selective rotation, relative to the frame base, about an axis generally perpendicular to the platform. The seat may be selectively rotated between a forward-facing position and a rearward-facing position. The seat may further be adapted to be selectively reconfigurable between a seated configuration and a standing configuration.

11 Claims, 45 Drawing Sheets

(56) References Cited

U.S. PATENT DOCUMENTS

| | | | |
|---|---|---|---|
| 1,112,595 A | 10/1914 | Brown | |
| 1,197,014 A | 9/1916 | Cunningham | |
| 1,241,357 A | 9/1917 | Drosdowet | |
| 1,336,725 A | 4/1920 | Biwoin | |
| 1,357,878 A | 11/1920 | Lark | |
| 1,385,959 A | 7/1921 | Weasler | |
| 1,421,260 A | 6/1922 | Kurnick | |
| 1,480,451 A | 1/1924 | Koch | |
| 1,508,500 A | 9/1924 | Bingen et al. | |
| 1,524,416 A | 1/1925 | Waitekaites et al. | |
| 1,553,889 A | 9/1925 | Boettcher | |
| 1,586,411 A | 5/1926 | Csima | |
| 1,617,037 A | 2/1927 | Vlcek | |
| 1,662,754 A | 3/1928 | Millard | |
| 1,793,848 A | 2/1931 | Gill et al. | |
| 2,137,574 A | 11/1938 | Kromer | |
| 2,415,146 A | 2/1947 | Nanna | |
| 2,451,956 A | 10/1948 | Kemper | |
| 2,481,725 A | 9/1949 | Culley et al. | |
| 2,606,593 A | 8/1952 | Beurskens | |
| 2,608,697 A | 9/1952 | Condemi | |
| 2,631,651 A | 3/1953 | Boysel | |
| 2,644,958 A | 7/1953 | Davis | |
| 2,689,355 A | 9/1954 | De Frank | |
| 2,708,585 A | 5/1955 | Garnes | |
| 2,711,328 A | 6/1955 | Shone et al. | |
| 2,842,374 A * | 7/1958 | Benson et al. | 280/47.39 |
| 2,869,145 A | 1/1959 | Gregory | |
| 2,904,344 A | 9/1959 | Lombardo | |
| 3,322,460 A | 5/1967 | Leverman | |
| 3,756,333 A | 9/1973 | Rubin | |
| 3,806,117 A | 4/1974 | Foster | |
| 3,820,614 A | 6/1974 | Askinazy | |
| 5,088,138 A | 2/1992 | Munster | |
| 5,090,724 A * | 2/1992 | Fiore | 280/643 |
| 5,380,023 A | 1/1995 | McBee | |
| 5,572,903 A | 11/1996 | Lee | |
| 5,622,375 A | 4/1997 | Fairclough | |
| 5,636,853 A | 6/1997 | Huang | |
| 5,664,795 A | 9/1997 | Haung | |
| 5,688,211 A | 11/1997 | Myers | |
| 5,820,144 A * | 10/1998 | Wang | 280/47.38 |
| 5,839,748 A | 11/1998 | Cohen | |
| 6,086,087 A * | 7/2000 | Yang | 280/658 |
| 6,203,054 B1 | 3/2001 | Matsumoto | |
| 6,231,056 B1 | 5/2001 | Wu | |
| 6,244,658 B1 | 6/2001 | Parent et al. | |
| 6,270,111 B1 | 8/2001 | Hanson | |
| 6,357,784 B1 | 3/2002 | Mitzman | |
| 6,375,213 B1 | 4/2002 | Suzuki | |
| 6,386,563 B1 | 5/2002 | Chen et al. | |
| 6,513,827 B1 | 2/2003 | Barenbrug | |
| 6,581,957 B1 | 6/2003 | Lan | |
| 6,588,527 B2 | 7/2003 | Lerner et al. | |
| 6,679,506 B2 | 1/2004 | Koppes et al. | |
| 7,025,364 B1 | 4/2006 | Clarke | |
| 7,059,625 B2 * | 6/2006 | Horacek | 280/642 |
| 7,234,722 B1 | 6/2007 | Madigan et al. | |
| 7,775,548 B2 | 8/2010 | McIntyre et al. | |
| 2007/0114755 A1* | 5/2007 | Pasternak et al. | 280/304.1 |
| 2007/0246915 A1 | 10/2007 | McIntyre et al. | |
| 2009/0160162 A1 | 6/2009 | Bizzell et al. | |

\* cited by examiner

10

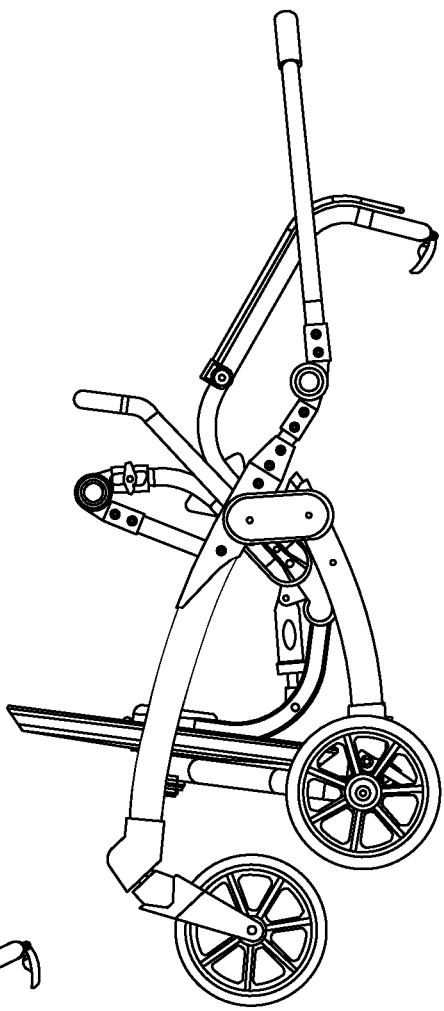
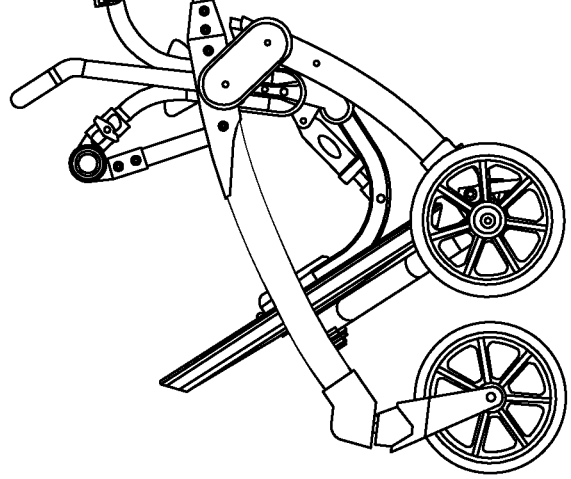
FIG. 15A
FIG. 15B

STROLLER WITH MULTIPLE CONFIGURATIONS

CROSS-REFERENCE TO RELATED APPLICATION

The present application is a U.S. continuation patent application of, and claims priority under 35 U.S.C. §120 to, U.S. nonprovisional patent application Ser. No. 12/274,272, filed Nov. 19, 2008 now abandoned and published as U.S. Patent Application Publication No. US 2009/0160162 A1, which '272 application is a U.S. nonprovisional patent application of, and claims priority under 35 U.S.C. §119(e) to, each of U.S. provisional patent application Ser. No. 60/989,111, filed Nov. 19, 2007, and U.S. provisional patent application Ser. No. 61/025,717, filed Feb. 1, 2008. Each of the foregoing U.S. patent applications and U.S. patent application publications is expressly incorporated by reference herein in its entirety. Additionally, U.S. Pat. No. 7,234,722 to Madigan et al., issued Jun. 26, 2007, is expressly incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to an improved child stroller, and particularly to an improved child stroller for supporting a child in any of a seated, reclined, or standing position, while simultaneously providing the ability to rotate the child to face any preferred direction.

Child strollers have consistently provided valuable assistance to mobile families with young children. Over the years, numerous types of strollers have been developed to meet various needs. Known strollers are collapsible to permit the stroller to be packed and carried on family trips. Other known strollers provide amusements for a child to play with while situated in the stroller. Still other known strollers provide a child with the ability to stand up or recline within the stroller. Further still, other known strollers provide a child with the ability to rotate within the stroller seat to face in any of multiple directions. However, without these various improvements collected within a single stroller, a family is left to choose from among one or more of these various features when selecting a stroller for purchase.

Accordingly a need exists for improvement in the field of child strollers, whereby a stroller with multiple configurations is able to meet the various needs and expectations of a family with young children. This, and other needs, is addressed by one or more aspects of the present invention.

SUMMARY OF THE INVENTION

The present invention includes many aspects and features. Moreover, while many aspects and features relate to, and are described in, the context of child strollers, the present invention is not limited to use only in child strollers, as will become apparent from the following summaries and detailed descriptions of aspects, features, and one or more embodiments of the present invention.

Accordingly, one aspect of the present invention relates to a stroller for carrying a child in a plurality of configurations. An exemplary such stroller includes a frame having a frame base defining a forward-facing direction and a rearward-facing direction and at least two side members attached at opposite sides of the frame base; a plurality of wheels connected to the frame; and a seat, arranged generally above a platform attached to the frame and configured for selective rotation, relative to the frame base, about an axis, generally perpendicular to the platform, between a forward-facing position and a rearward-facing position. Furthermore, in this aspect of the invention, the seat is adapted to be selectively reconfigurable between a seated configuration and a standing configuration.

In variations of this aspect, the seat may be carried by a central support member at a crossbar and may include a base portion and a back portion adjustable relative to one another for selective reconfiguration of the seat, wherein the central support member is supported at a lower end thereof by the frame base. Furthermore, in the seated configuration, the base portion may be arranged in generally parallel relationship with the platform and the back portion may be arranged to be generally upright; in the standing configuration, the base portion may be pivoted downward to permit a child to stand on an upper surface of the platform; and the seat may be further adapted to be selectively reconfigurable to a reclined position, whereby the base portion may be arranged in a generally parallel relationship with the platform and the back portion may be reclined.

In additional variations of this aspect, the stroller may further comprise a tray bar attached at connection zones located at opposite ends of the crossbar and rotatable with the seat; the tray bar may be configured for telescoping adjustment outwardly and inwardly, relative to the seat, to accommodate children of varying sizes; the tray bar may be adapted to receive a child amusement device by attachment thereto; the central support member may have a generally arcuate shape so as to displace at least a portion of the central support member away from the seat; the seat may further include a lower leg portion attachable at an end of the base portion and outwardly pivotable, relative to the base portion, to provide a child with lower leg support; the stroller may further comprise a footbar to actuate collapse of the frame; the stroller may further comprise a shock absorber for dampening motion of the seat relative to the platform; an upper surface of the platform may be textured to prevent a child standing thereon from slipping; the stroller may further comprise wheel brakes at one or more of the plurality of wheels; each of the at least two side members may include a hinge in the respective midsection thereof to permit pivotable movement of upper portions of the side members, wherein such pivotable movement of the upper portions of the side members permits selective adjustment of the height of a handle attached at the upper portions of the side members; the stroller may further comprise a canopy carried by and rotatable with the seat and pivotable between extendable and retractable positions; and the stroller may further comprise a latch mechanism to prevent the seat from free rotation relative to the frame base.

Another aspect of the invention relates to a stroller for carrying a child in a plurality of configurations including a frame having a frame base defining forward and rearward portions and at least two side members attached at opposite sides of the frame base; a plurality of wheels connected to the frame; a lower support assembly supported by the frame base, the lower support assembly having a central support member and a platform; and a seat carried by the central support member generally above the platform at a crossbar. Furthermore, in this aspect of the invention, the seat has a base portion and a back portion and is configured for selective rotation, relative to the frame base, about an axis of rotation generally perpendicular to an upper surface of the platform. Still yet in this aspect, the seat is adapted to be selectively reconfigurable between a seated configuration and a standing configuration.

In variations of this aspect, the stroller may further comprise a footbar to actuate collapse of the frame; the stroller may further comprise a shock absorber for dampening motion of the seat relative to the platform; the stroller may further comprise a tray bar attached at connection zones located at opposite ends of the crossbar and rotatable with the seat; the tray bar may be configured for telescoping adjustment outwardly and inwardly, relative to the seat, to accommodate children of varying sizes; the tray bar may be adapted to receive a child amusement device by attachment thereto; the upper surface of the platform may be textured to prevent a child standing thereon from slipping; the stroller may further comprise wheel brakes at one or more of the plurality of wheels; the central support member may have a generally arcuate shape so as to displace at least a portion of the central support member away from the seat; each of the at least two side members may include a hinge in the respective midsection thereof to permit pivotable movement of upper portions of the side members, wherein such pivotable movement of the upper portions of the side members permits selective adjustment of the height of a handle attached at the upper portions of the side members; the stroller may further comprise a canopy carried by and rotatable with the seat and pivotable between extendable and retractable positions; the seat may further include a lower leg portion attachable at an end of the base portion and outwardly pivotable relative to the base portion, to provide a child with lower leg support; the stroller may further comprise a latch mechanism to prevent the seat from free rotation relative to the frame base; and the seat may be configured for selective rotation between a forward-facing position and a rearward-facing position. Furthermore, in the seated configuration, the base portion may be arranged in generally parallel relationship with the platform and the back portion may be arranged to be generally upright; in the standing configuration, the base portion may be pivoted downward to permit a child to stand on the upper surface of the platform; and the seat may be further adapted to be selectively reconfigurable to a reclined position, whereby the base portion may be arranged in a generally parallel relationship with the platform and the back portion may be reclined.

Another aspect of the invention relates to a stroller for carrying a child in a plurality of configurations including a frame having a frame base defining forward and rearward portions and at least two side members attached at opposite sides of the frame base; a plurality of wheels connected to the frame; a seat arranged generally above a platform attached to the frame and configured for selective rotation, relative to the frame base, about an axis generally perpendicular to the platform; and a shock absorber for dampening motion of the seat relative to the platform. Furthermore, in this aspect of the invention, the seat is adapted to be selectively reconfigurable between a seated configuration and a standing configuration.

In variations of this aspect, the seat may be carried by a central support member at a crossbar and may include a base portion and a back portion adjustable relative to one another for selective reconfiguration of the seat, the central support member being supported at a lower end thereof by the frame base. Furthermore, in the seated configuration, the base portion may be arranged in generally parallel relationship with the platform and the back portion may be arranged to be generally upright; in the standing configuration, the base portion may be pivoted downward to permit a child to stand on an upper surface of the platform; and the seat may be further adapted to be selectively reconfigurable to a reclined position, whereby the base portion may be arranged in a generally parallel relationship with the platform and the back portion may be reclined.

In additional variations of this aspect, the stroller may further comprise a tray bar attached at connection zones located at opposite ends of the crossbar and rotatable with the seat; the tray bar may be configured for telescoping adjustment outwardly and inwardly, relative to the seat, to accommodate children of varying sizes; the tray bar may be adapted to receive a child amusement device by attachment thereto; the central support member may have a generally arcuate shape so as to displace at least a portion of the central support member away from the seat; the seat may further include a lower leg portion attachable at an end of the base portion and outwardly pivotable relative to the base portion, to provide a child with lower leg support; the stroller may further comprise a footbar to actuate collapse of the frame; an upper surface of the platform may be textured to prevent a child standing thereon from slipping; the stroller may further comprise wheel brakes at one or more of the plurality of wheels; each of the at least two side members may include a hinge in the respective midsection thereof to permit pivotable movement of upper portions of the side members, wherein such pivotable movement of the upper portions of the side members permits selective adjustment of the height of a handle attached at the upper portions of the side members; the stroller may further comprise a canopy carried by and rotatable with the seat and pivotable between extendable and retractable positions; the stroller may further comprise a latch mechanism to prevent the seat from free rotation relative to the frame base; and the seat may be configured for selective rotation between a forward-facing position and a rearward-facing position.

Still yet another aspect of the invention relates to a stroller including a frame having a frame base and at least two side members, the side members attached at opposite sides of the frame base; a plurality of wheels connected to the frame; a platform, supported by the frame, having a center; a central support having a lower end, rotatably mounted on the platform at the center thereof, and an upper end, the upper end being laterally displaced from the center of the platform; and a seat, having a seat base portion and a seat back portion, carried by the central support, the seat back portion being rotatable relative to the seat base portion.

In variations of this aspect, the platform may be connected to the frame at a location substantially at the center of the platform; the platform may be disc-shaped; the central support may be arcuate in shape; the central support may be L-shaped such that a lower end of the "L" is rotatably mounted on the platform and such that the seat is attached to an upper end of the "L;" and the seat may be selectively positionable to permit support of a child in standing, sitting and reclining positions.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals (except that in at least some cases, elements carrying out the same or similar functions but having a different form factor are identified by the same reference numeral), and wherein.

FIGS. 13A and 13B, FIGS. 14A and 14B, FIGS. 15A and 15B and FIGS. 16A and 16B are right side elevational views of the stroller depicted in FIG. 5, illustrating a method of collapsing the stroller;

DETAILED DESCRIPTION

Figure 1A:
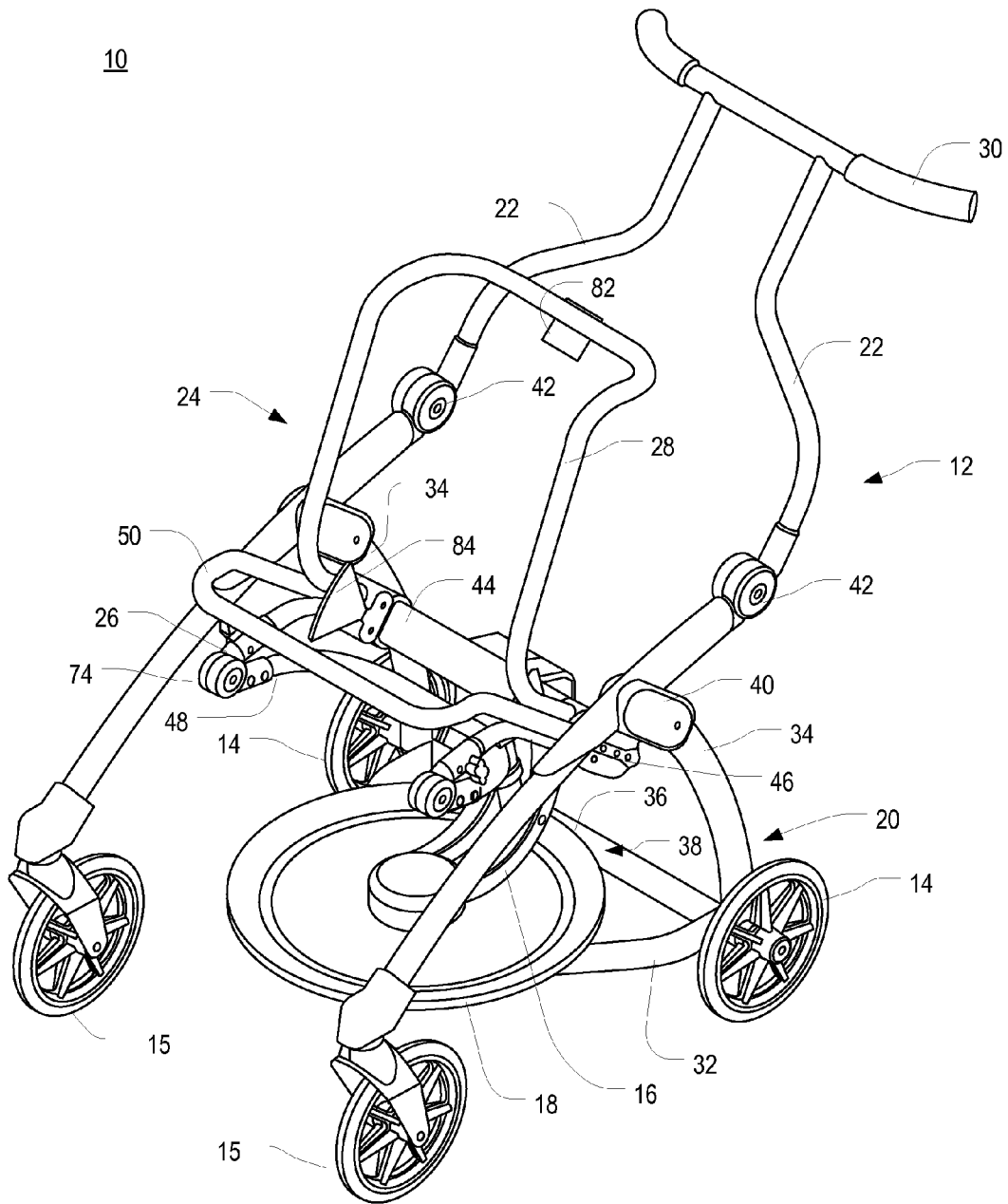
FIGS. 1A and 1B are each a front perspective view of a first embodiment of a stroller in accordance with one or more aspects of the present invention.
Figure 1B:
Figure 2A:
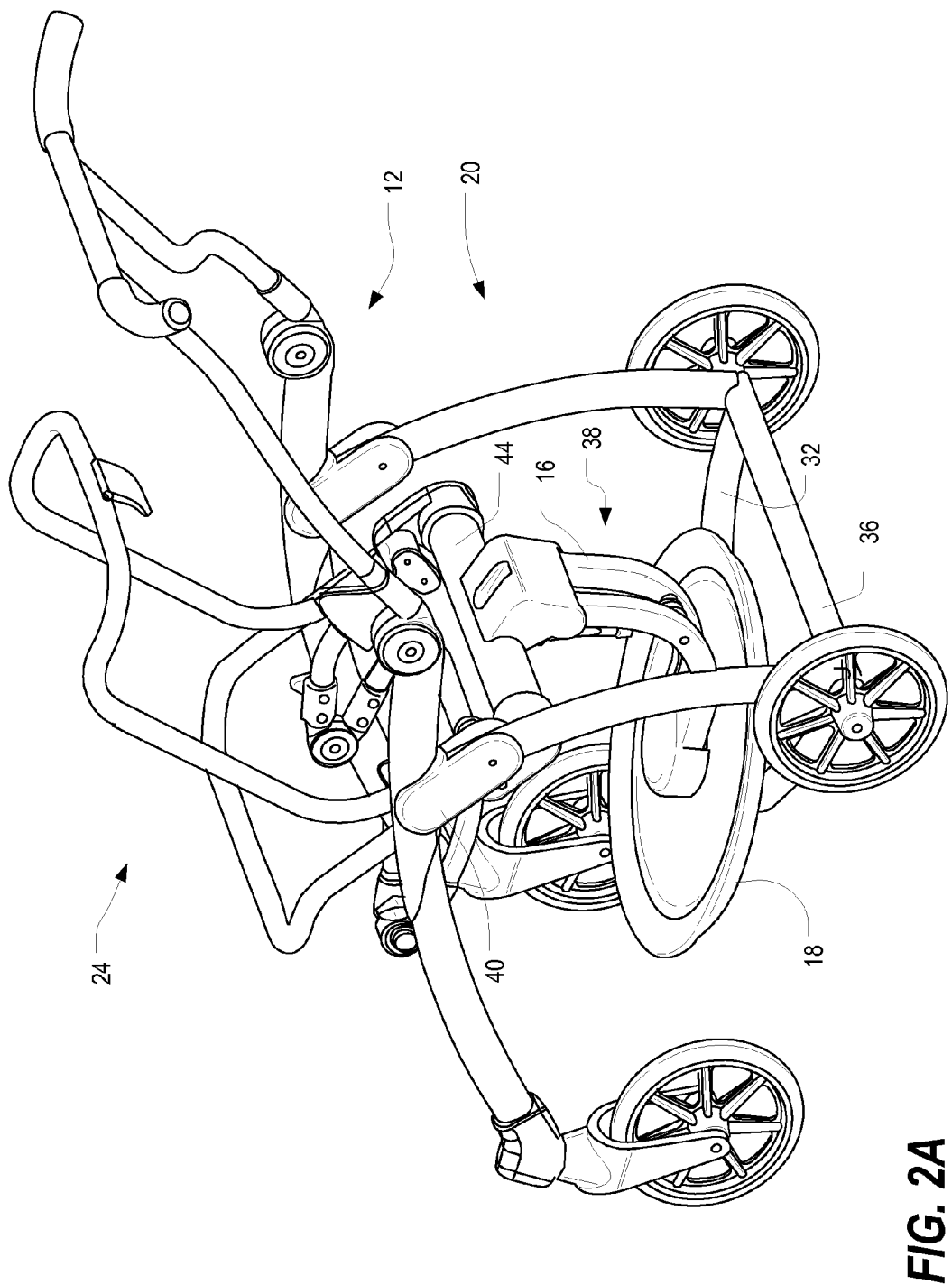
FIGS. 2A and 2B are each a rear perspective view of the stroller depicted in FIGS. 1A and 1B.
Figure 2B:
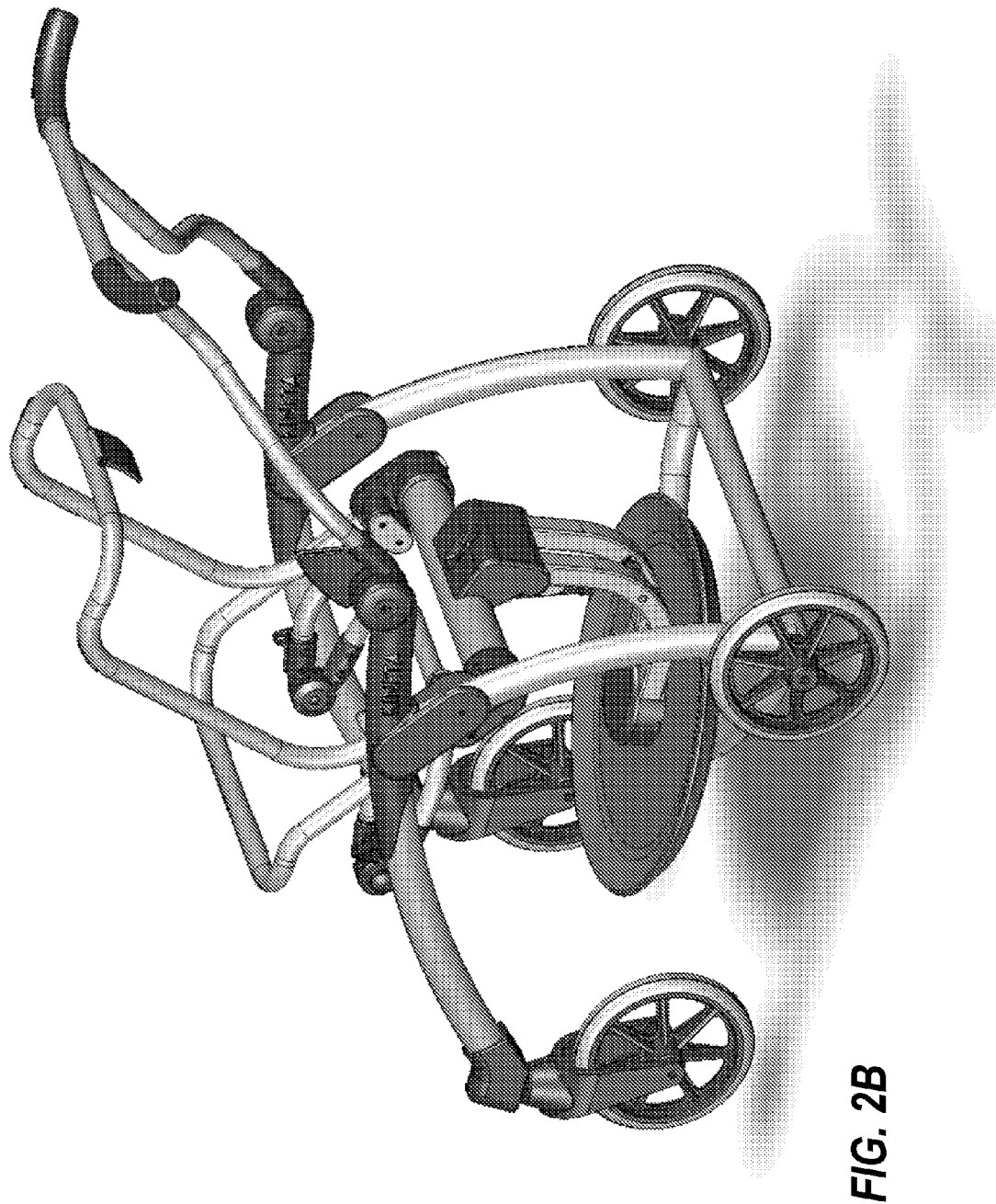
Figure 3A:
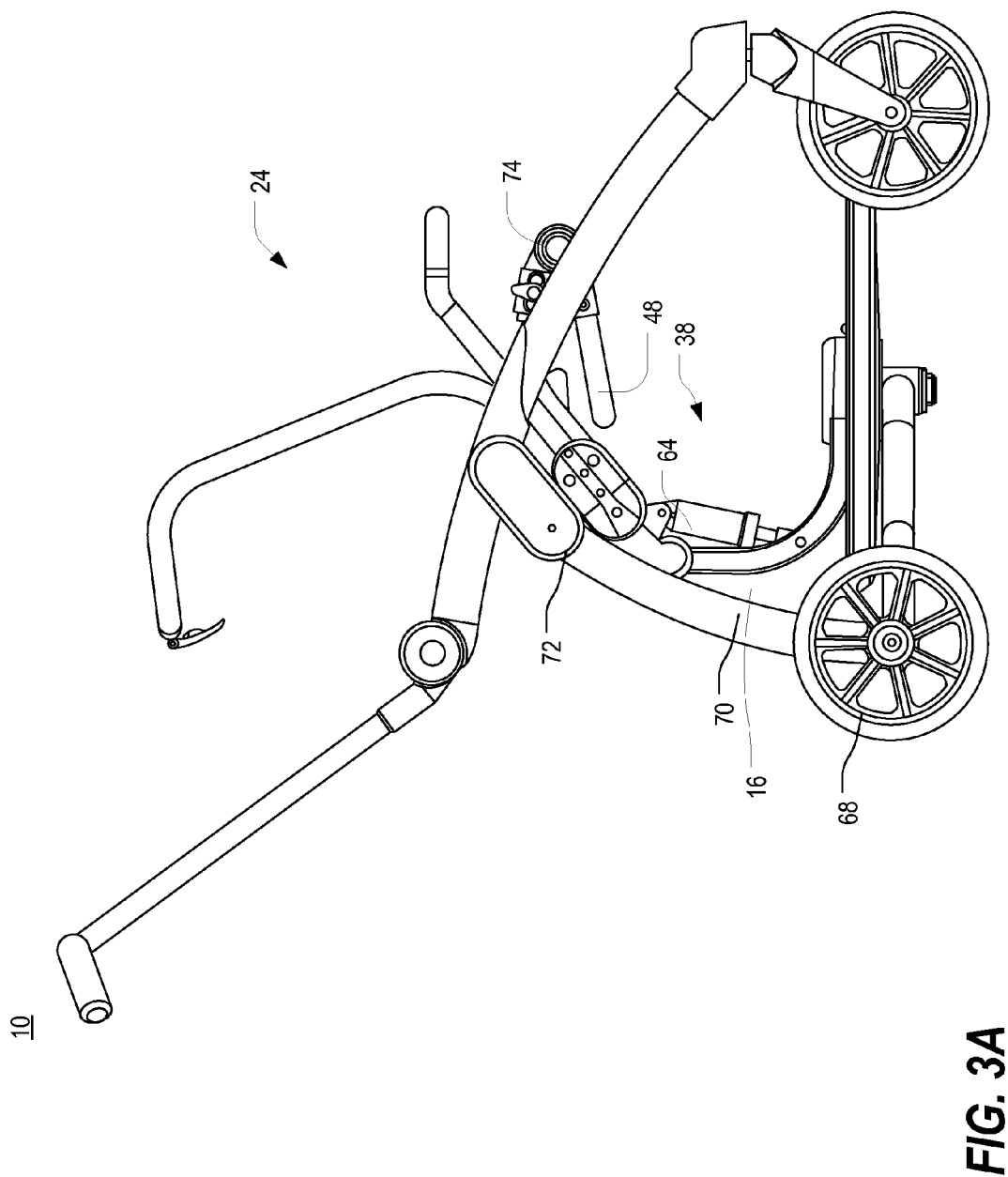
FIGS. 3A and 3B are each a left elevation view of the stroller depicted in FIGS. 1A and 1B.
Figure 3B:
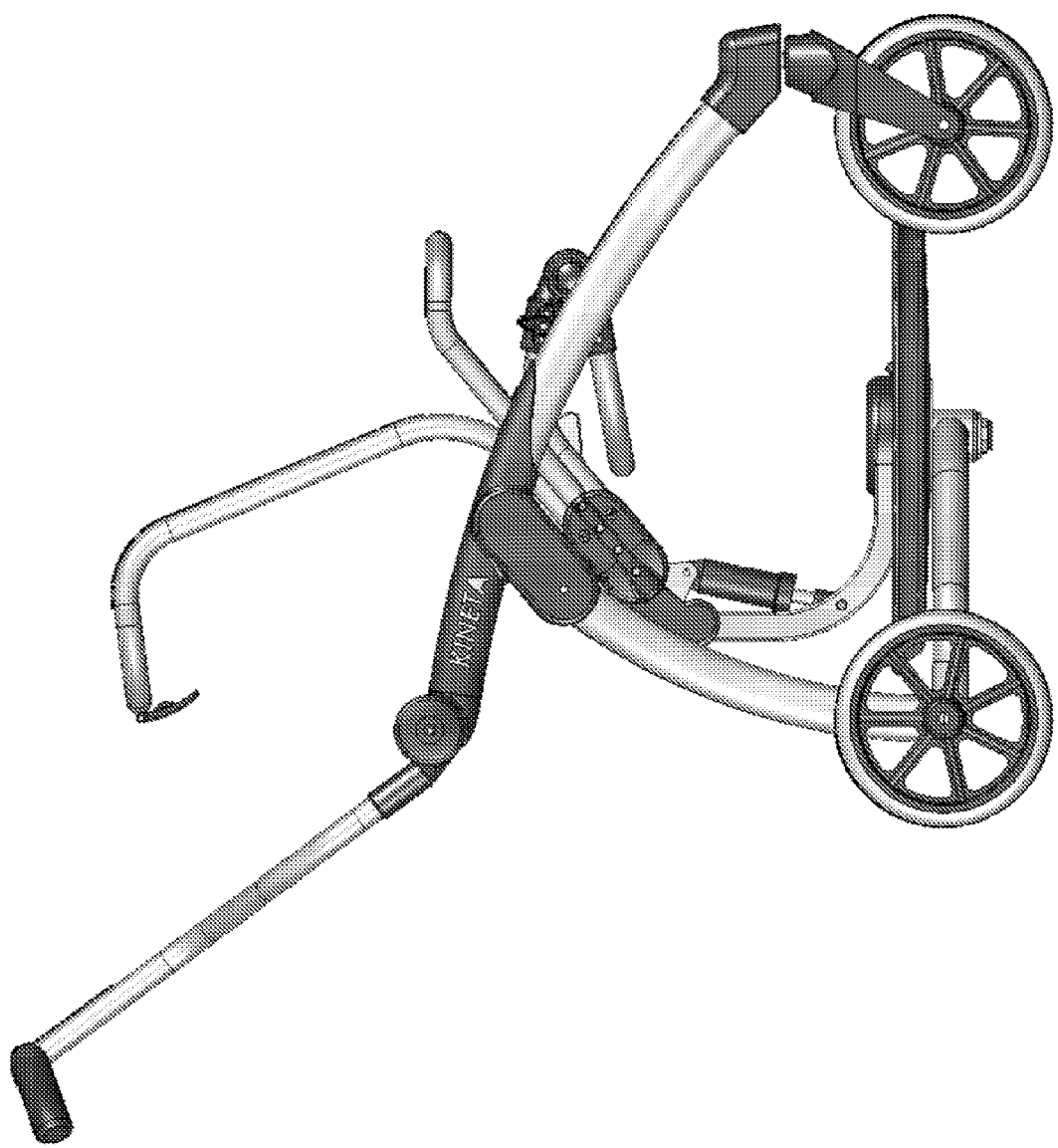
Figure 4A:
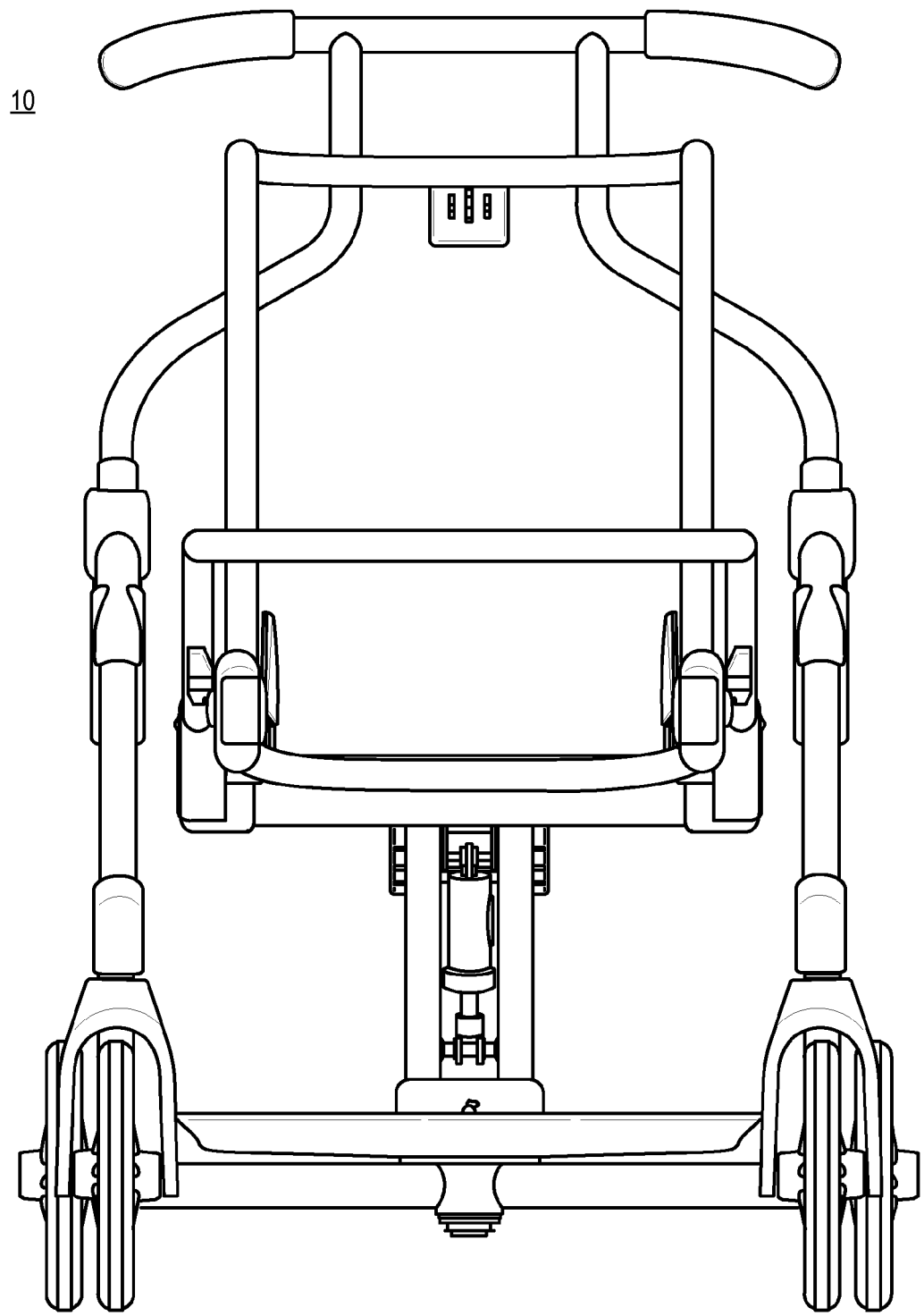
FIGS. 4A and 4B are each a front elevation view of the stroller depicted in FIGS. 1A and 1B.
Figure 4B:
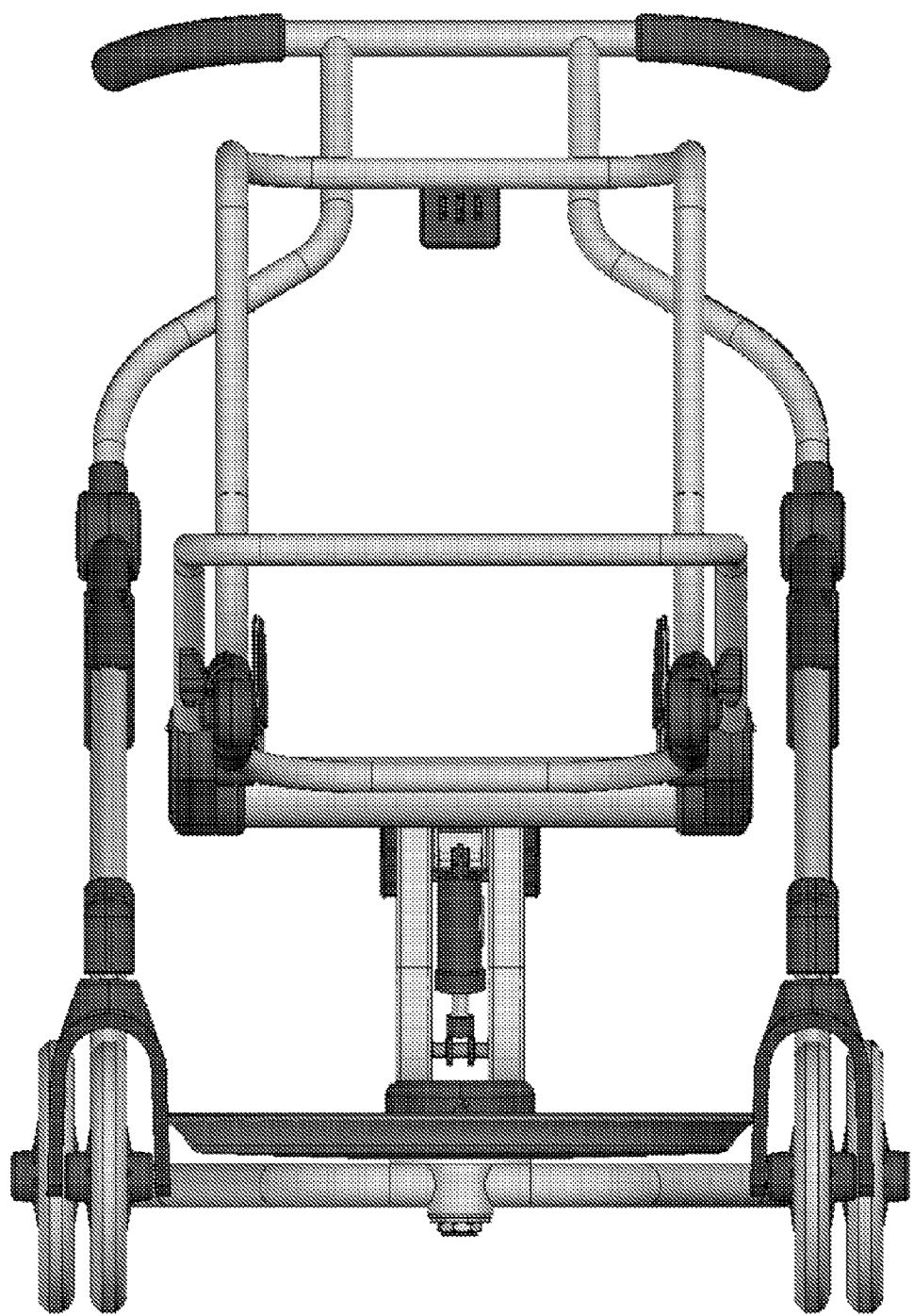

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to FIGS. 1-4, an embodiment of a stroller 10 in accordance with one or more aspects of the present invention is shown. The stroller 10 generally includes a frame 12 with a plurality of wheels 14,15 attached thereto to support the frame 12 upon a surface. The wheels 14,15 permit the stroller 10 to be rolled, whether pushed or pulled, with relative ease. The frame 12 is comprised of a frame base 20 and two side members 22 located at opposing sides of the frame 12. Located at the center of the stroller 10 is a lower support assembly 38, which is preferably attached to and supported by the frame base 20. The lower support assembly 38 includes a central support 16 and a platform 18 that is arranged to be in generally parallel relationship to the surface on which the wheels 14,15 of the stroller 10 are supported. The central support 16 supports a seat 24 whose frame includes a seat base portion 26 and a seat back portion 28. Each of these components will be discussed in greater detail below in connection with the embodiment shown in FIGS. 1-4 as well other embodiments shown in subsequent drawings.

The components that comprise the frame 12 are preferably composed of a lightweight yet durable material, such as aluminum. The arrangement of the frame base 20 and side members 22 of the frame 12 may vary in accordance with various preferred designs. In the embodiment depicted in FIGS. 1-4, the frame base 20 includes angled base portions 32 for supporting the lower support assembly 38 of the stroller 10 as well as two upright portions 34 extending generally upright to interconnect the frame base 20 with the two side members 22. As can be seen for example in FIGS. 1-4, the angled base portions 32 are configured to curve underneath the midsection of the stroller 10, thereby providing a means to support the central support 16 in a generally central position relative to the wheels 14,15 of the stroller 10. Rear wheels 14 of the stroller 10 are preferably attached at either end of the base portions 32 at the points where the base portions 32 meet the two upright portions 34. Preferably, a rear crossbar 36 may be connected between the rear wheels 14 to provide enhanced structure and greater stability to the stroller 10.

Figure 17:
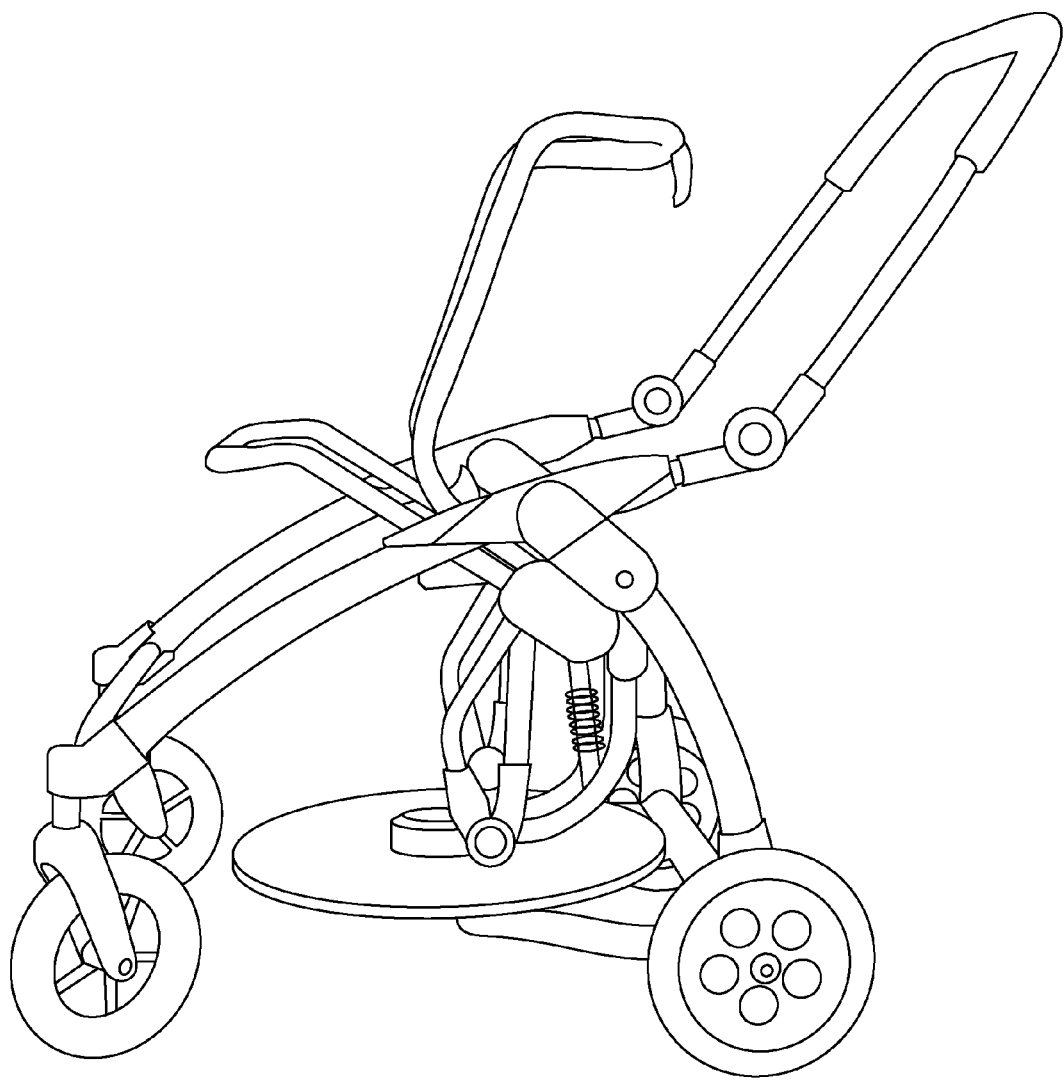
FIGS. 17-19 is are photographic illustrations of a fourth embodiment of a stroller in accordance with one or more aspects of the present invention.
Figure 18:
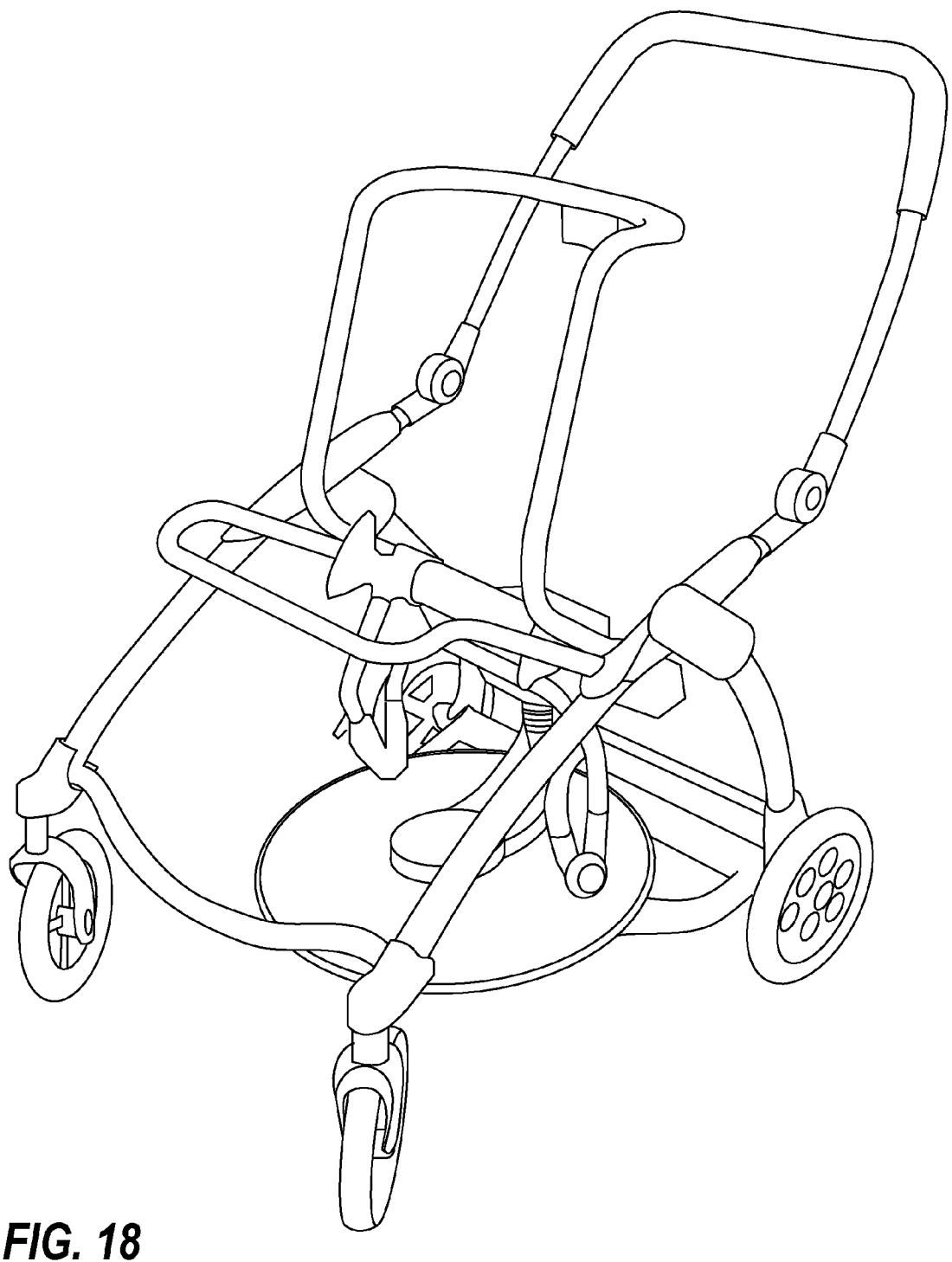
Figure 19:
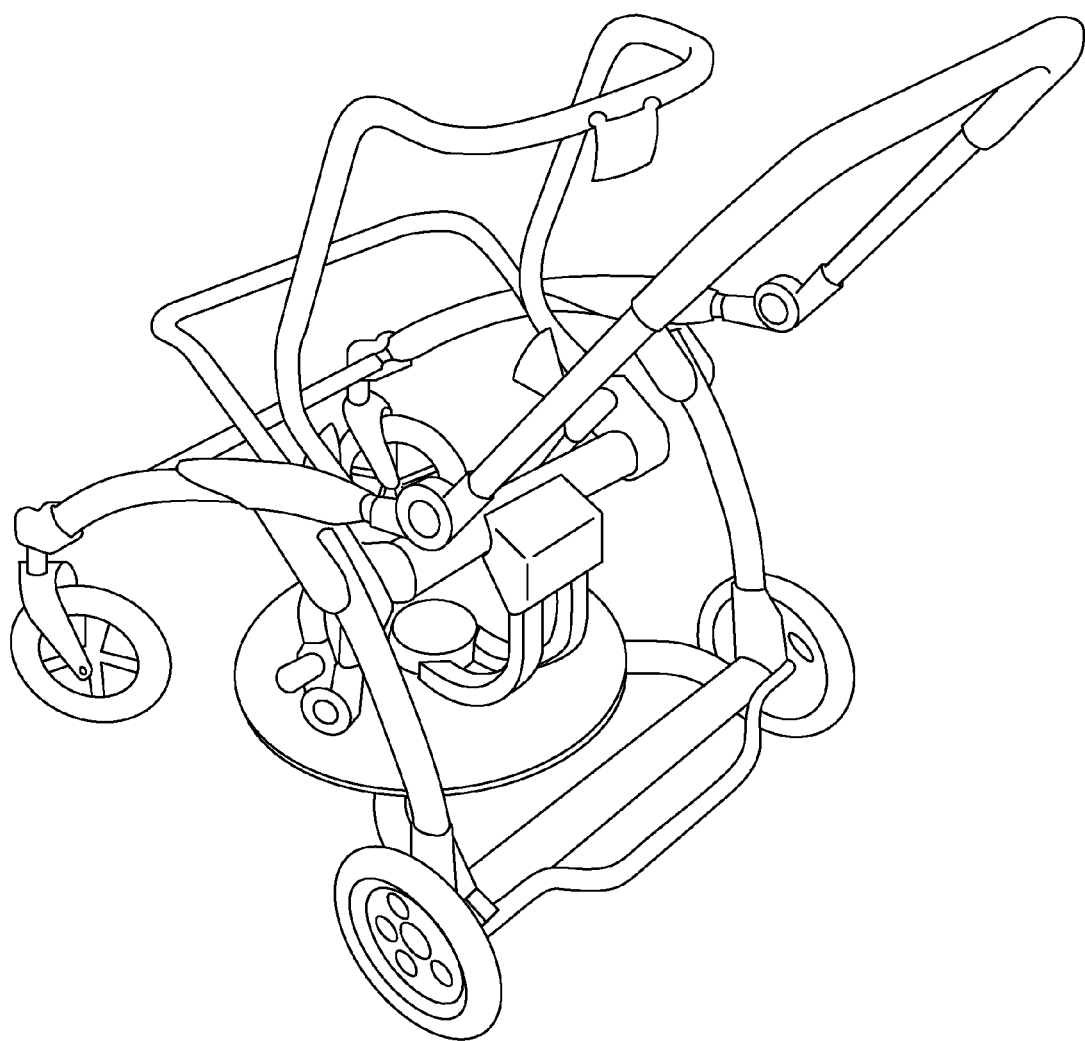
Figure 20:
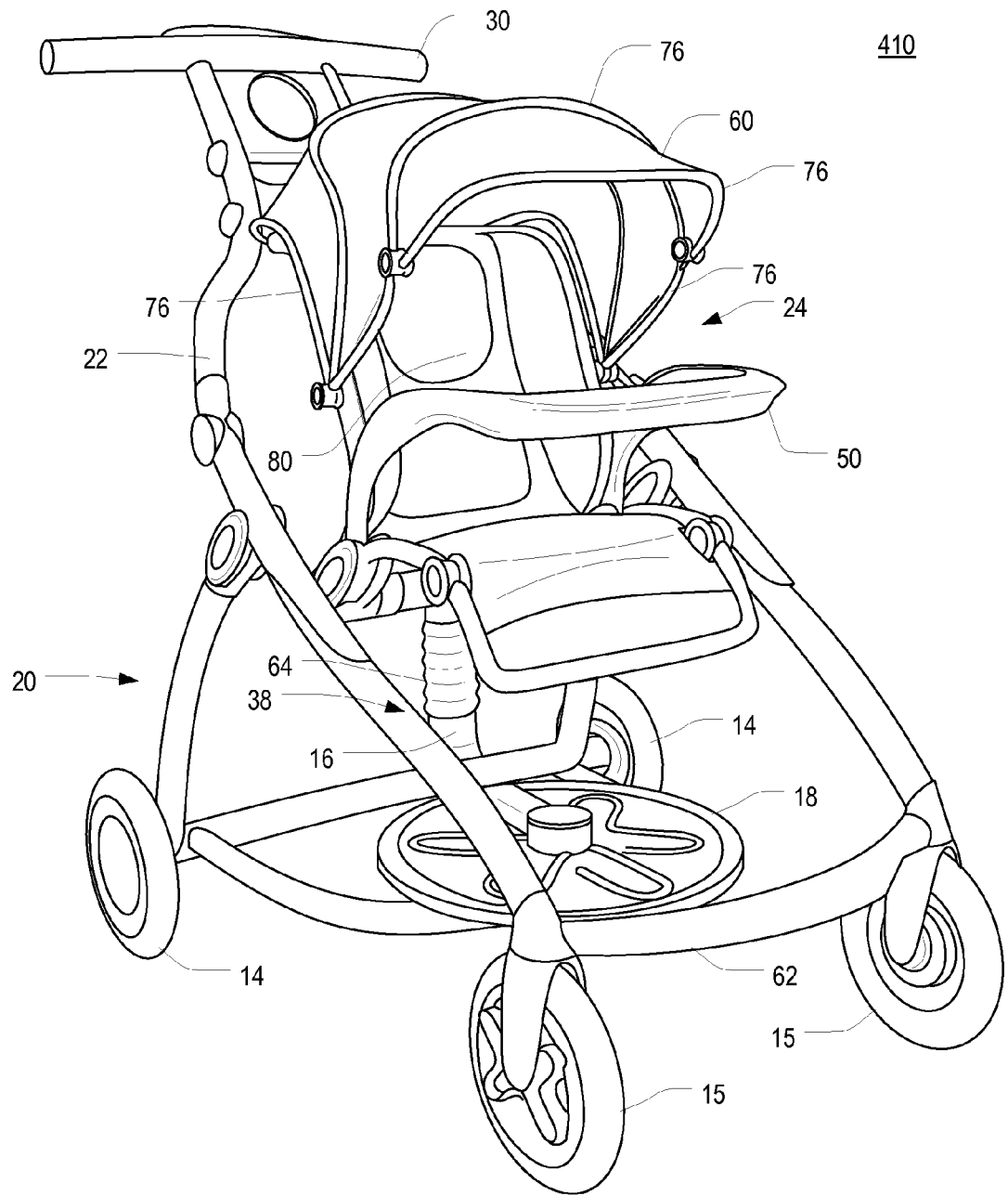
FIG. 20 is a front perspective view of a fifth embodiment of a stroller in accordance with one or more aspects of the present invention, shown with the seat in a seated configuration and the canopy extended.

As further shown in FIGS. 1-4, the side members 22 extend from the front wheels 15 of the stroller 10 along opposite sides of the seat 24, culminating at opposite ends thereof at a handle 30. The side members 22 interconnect with the upright portions 34 of the frame base 20 at respective points along the lengths thereof. Preferably, the side members 22 interconnect with the frame base 20 at frame joints 40 that permit the stroller 10 to be collapsed, as will be explained in greater detail below. Additionally, the side members 22 may have hinges 42 in the midsections thereof to permit the handle 30 to be pivoted back against the respective lengths of the side members 22. The hinges 42 may also permit the handle 30 to be pivoted downwardly or upwardly such that its height corresponds proportionally to the height of the person pushing or pulling the stroller 10. Further still, it will be appreciated that although two front wheels 15 are shown, for example, in FIGS. 1-4, it is also within the scope of the invention for the side members 22 to culminate at a single front wheel, thereby providing the stroller 10 with an overall tripod form. Further, as shown in FIGS. 17-19, it is also within the scope of the invention for the two side members 22 and the handle 30 to be formed of an integral component.

The wheels 14,15 of the stroller 10 may be of any type or variety that might be preferred for use in connection with conventional strollers. Preferably, the wheels 14,15 are composed of a durable material capable of withstanding repeated wear and usage. Additionally, one or more of the wheels 14,15 may be configured to swivel about a respective swivel axis. In the embodiment depicted in FIGS. 17-19, the front wheels 15 of the stroller 10 are configured to swivel while the rear wheels 14 are fixed. It will be appreciated that the wheels 14,15 may further be configured to include conventional brakes (not shown in FIGS. 1-4 or FIGS. 17-19). Preferably, brakes are used in connection with at least the rear wheels 14 of the stroller 10. While various types of conventional brakes may be used in association with the wheels 14,15 of the stroller 10, the brakes would preferably be actuatable with a hand or foot lever conveniently arranged in the rear vicinity of the stroller 10 so as to permit actuation by a person pushing or pulling the stroller 10.

As still further shown in FIGS. 1-4, the lower support assembly 38 is attached to and supported by the angled base portions 32 of the frame base 20. Like the components of the frame 12, the central support 16 of the lower support assembly 38 is composed of a lightweight yet durable material, such as aluminum. Importantly, the central support 16 should be composed of a material sufficiently strong so as to support the weight of a child situated in the stroller 10. The central support 16 extends upward from the frame base 20 to connect to and support the seat 24 of the stroller 10. The central support 16 preferably has an arcuate shape, or other shape that displaces a substantial portion of the support 16 near the rear of the seat 24, thereby allowing the seat base portion 26 to be lowered as described hereinbelow. One or more alternative configurations are illustrated herein, including a central support 16 that is relatively straight.

As can be seen in FIGS. 1-4, the platform 18 of the lower support assembly 38 is located at the base thereof at the point of connection between the lower support assembly 38 and the frame base 20. In at least some embodiments, the platform 18 is disc-shaped and may be composed of a different material than the central support 16, as the platform is designed to engage into contact with the shoes or feet of a child situated in the stroller 10 in a standing position. Preferably, the platform 18 is composed of a durable material capable of withstanding consistent wear and tear on the upper surface thereof. In at least some embodiments it may also be desirable to provide a textured surface to help prevent a child's feet from slipping thereon. Additionally, the platform 18 is preferably connected to the frame base 20 in such a way that the platform 18 is fixed relative to the frame base 20 while, in at least one configuration, simultaneously permitting the central support 16 to rotate around an at least generally vertical axis that is generally perpendicular relative to an upper surface of the platform 18. As will be explained in greater detail below, the central support 16 of the lower support assembly 38 is thereby permitted to rotate relative to the frame 12 of the stroller 10.

As still further shown in FIGS. 1-4, the seat 24 of the stroller 10 is supported by the central support 16. In particular, the central support 16 preferably connects to the frame of the seat 24 in a fixed manner at a seat crossbar 44. The seat base portion 26 and the seat back portion 28 each preferably connect to connection zones 46 at opposite ends of the seat crossbar 44 in an adjustable manner so that the seat 24 may be arranged in different configurations as explained in more detail below. Each of the seat base portion 26 and the seat back portion 28 preferably has a separate adjustable connection so that each may be pivoted independent of the other. Additionally, each of the seat base portion 26 and the seat back portion 28 is wrapped in fabric material 80, in generally like manner to that shown in the strollers 410,510 of FIGS. 20-23 and FIGS. 24-27, to provide comfort and support to a child situated in the stroller 10. In particular, plush cushioning may be added to the seat 24 to provide added comfort. Further, as shown in FIGS. 1-4, the seat base portion 26 may include a lower leg portion 48 that is hinged at a seat base joint 74 to selectively provide leg support to a child situated in the stroller 10. Further still, the seat 24 may include a harness (not shown) to provide additional support to a child situated in the stroller 10. The harness, which may be of generally conventional design and construction, may be arranged to restrain the shoulders or waist of a child or support the legs of a child as might be desired.

As still further shown in FIGS. 1-4, the seat 24 may further include a tray bar 50 that attaches in a fixed manner to the connection zones 46 at opposite ends of the seat crossbar 44. The tray bar 50 may have any shape or configuration as might be preferred in connection with a stroller. For instance, the tray bar 50 may provide a flat surface to rest a food tray for a child or the tray bar 50 may provide a structural frame on which to mount an amusement center for a child. An amusement center may include various items to amuse the child while situated in the stroller 10, including rattles, toys, and puzzles. In at least some embodiments, the tray bar 50 may be adjusted outwardly and inwardly relative to the seat so as to adjust to the overall size of the child situated in the stroller 10. Preferably, the tray bar 50 is configured to be telescoped so that the portion of the tray bar 50 extending in front of the child can be adjusted outwardly or inwardly as might be desired.

Figure 12:
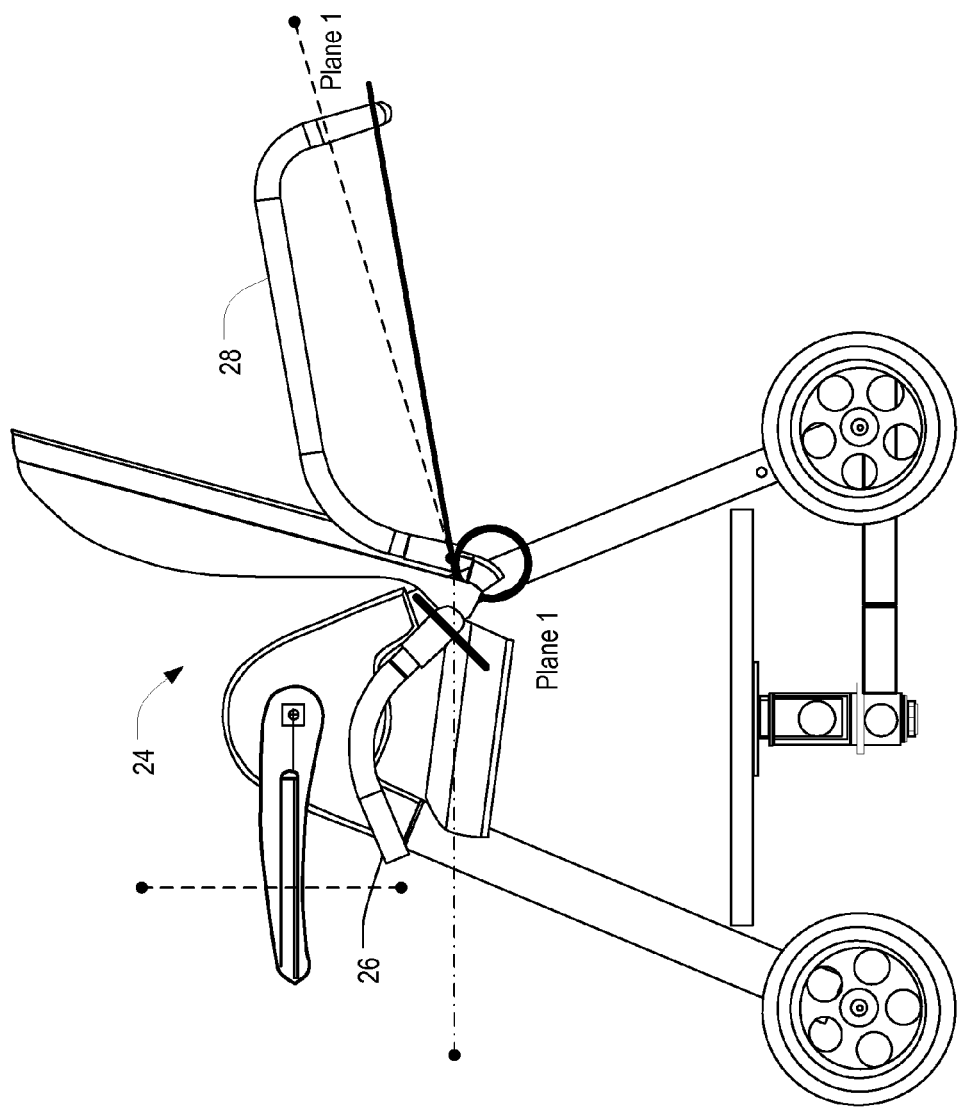
FIG. 12 is a side partial cutaway view of the stroller depicted in FIG. 10, shown with the seat in a reclined configuration.
Figure 13A:
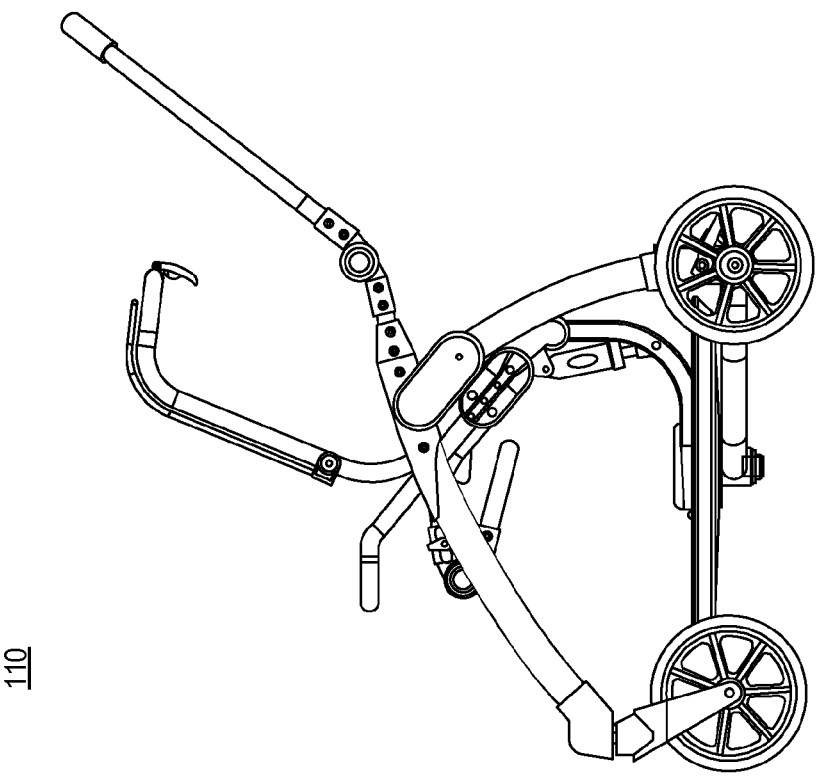
Figure 13B:
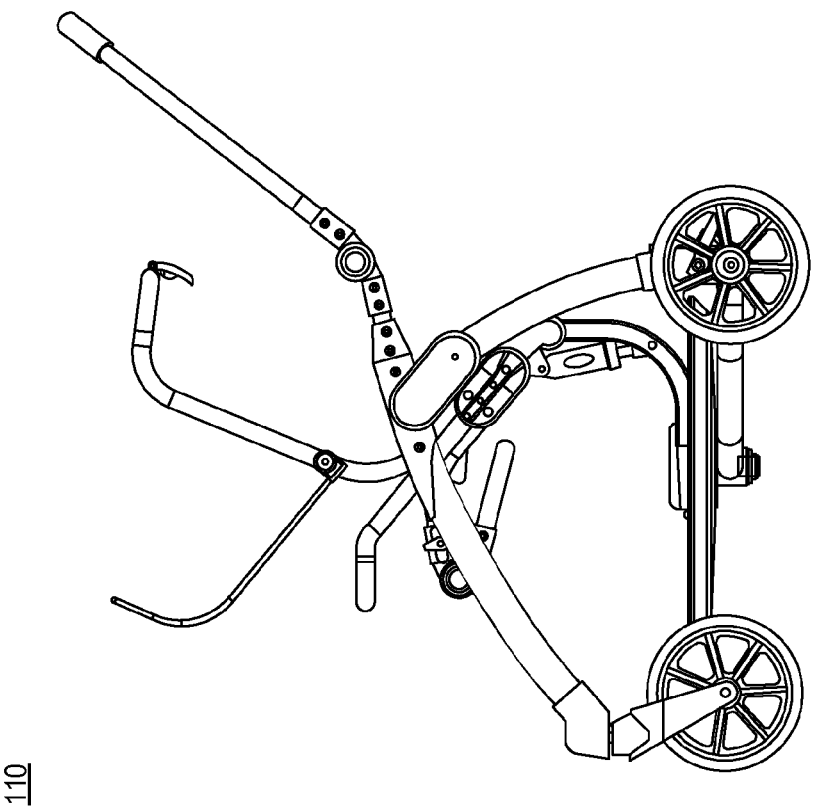
Figure 14B:
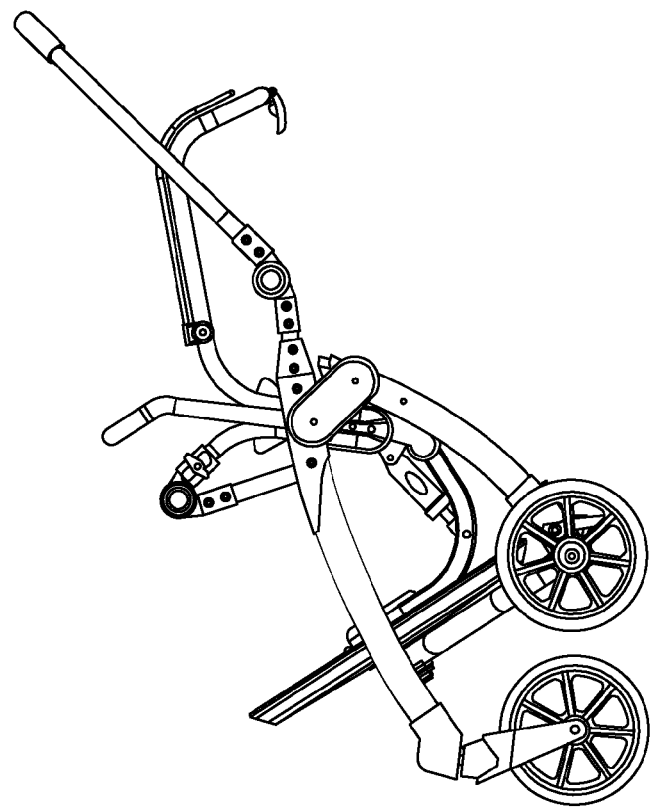
Figure 14A:
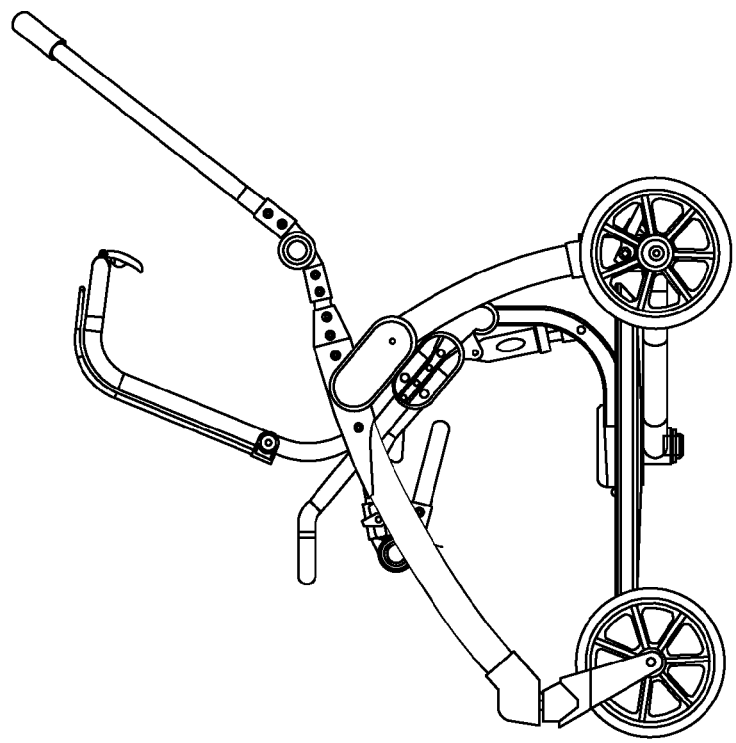

Now turning to FIGS. 5-9 and 10-12, the seat base portion 26 and the seat back portion 28 of a stroller 110,210 may each be adjusted separately to permit the seat 24 to be arranged in different configurations. For instance, in FIGS. 6, 10 and 11, a seated configuration is depicted wherein the seat base portion 26 is arranged in a generally parallel relationship with the platform 18 and the seat back portion 28 is arranged in a generally upright position. In FIGS. 5, 7, 8, and 9, a standing configuration is depicted, wherein the seat base portion 26 is arranged to be pivoted downward to permit a child in a standing position to be supported by the platform 18. In FIG. 12, a reclined position is depicted, wherein the seat base portion 26 is arranged in a generally parallel relationship with the platform 18 and the seat back portion 28 is arranged in a reclined position. The seat base portion 26 and the seat back portion 28 may be configured to have adjustment mechanisms, examples of at least some of which are shown and described herein, that are easily accessible and actuatable by a person using the stroller 110,210. The adjustment mechanisms for each of the seat base platform 26 and the seat back portion 28 may be arranged to have any particular design or construction as might be desired and preferably permit the seat base portion 26 and the seat back portion 28 to engage in pivoting movement.

Figure 27:
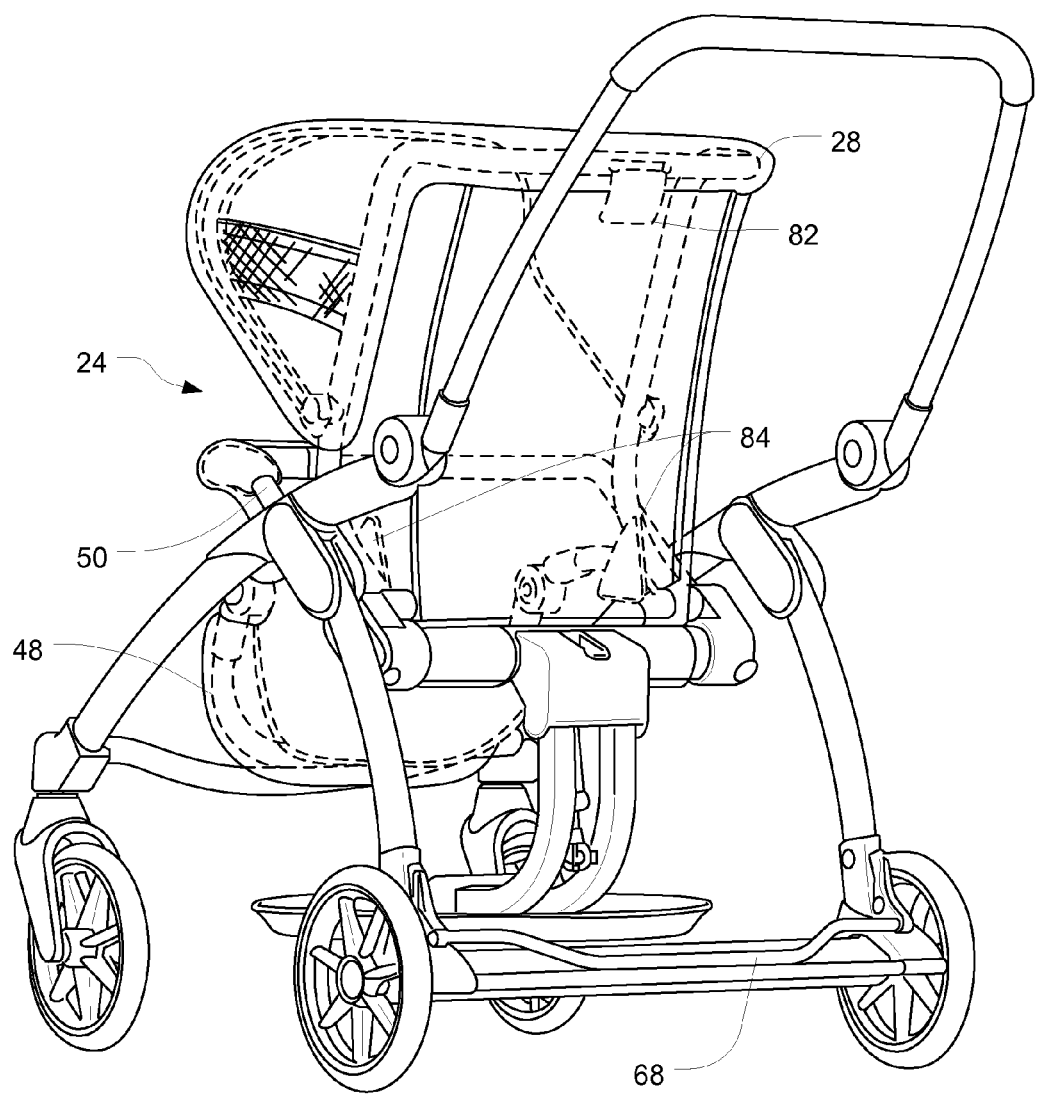
FIG. 27 is a rear perspective view of the stroller depicted in FIG. 24.
Figure 28A:
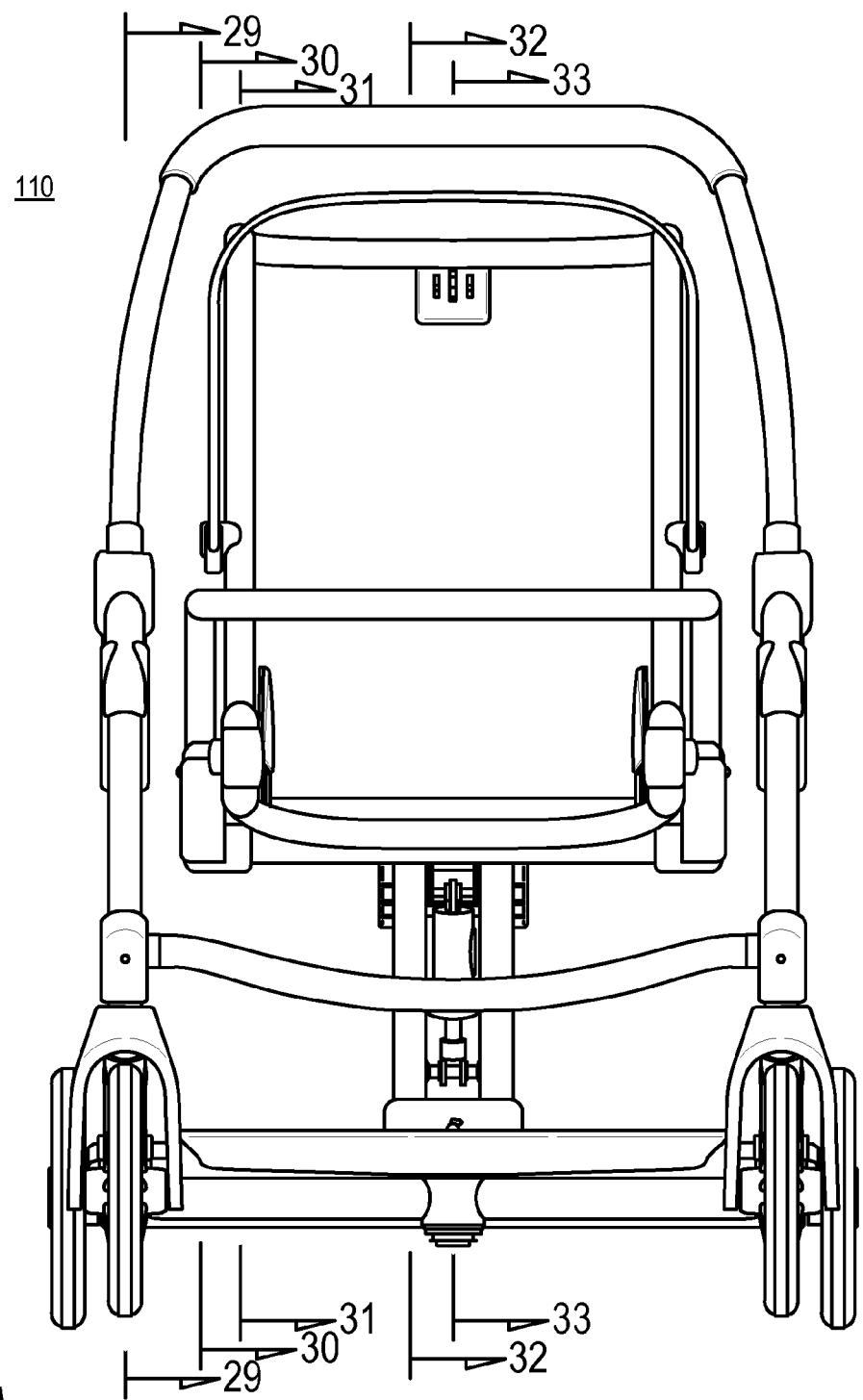
FIGS. 28A and 28B are each a front elevational view of the stroller depicted in FIG. 5.
Figure 28B:
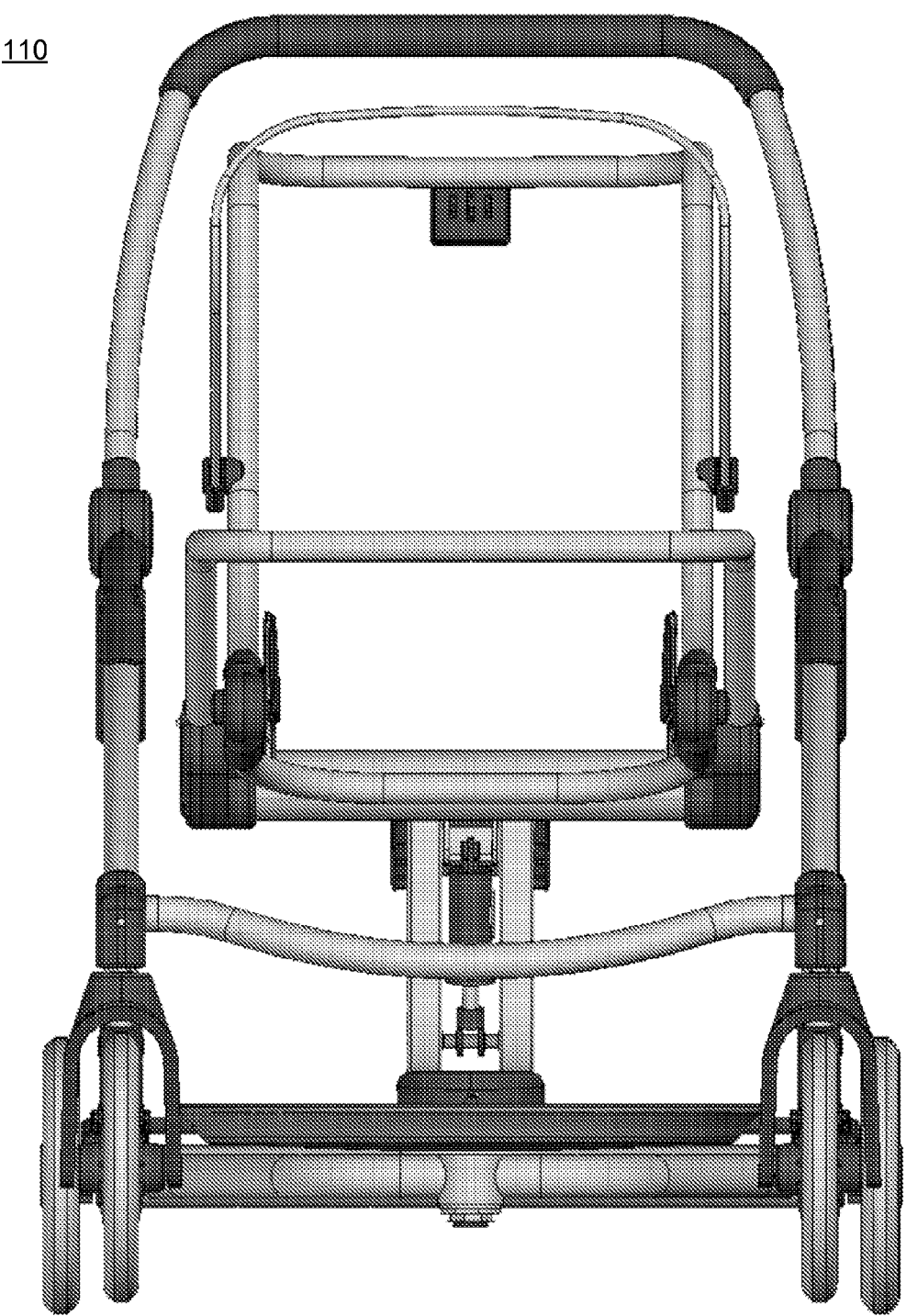
Figure 29A:
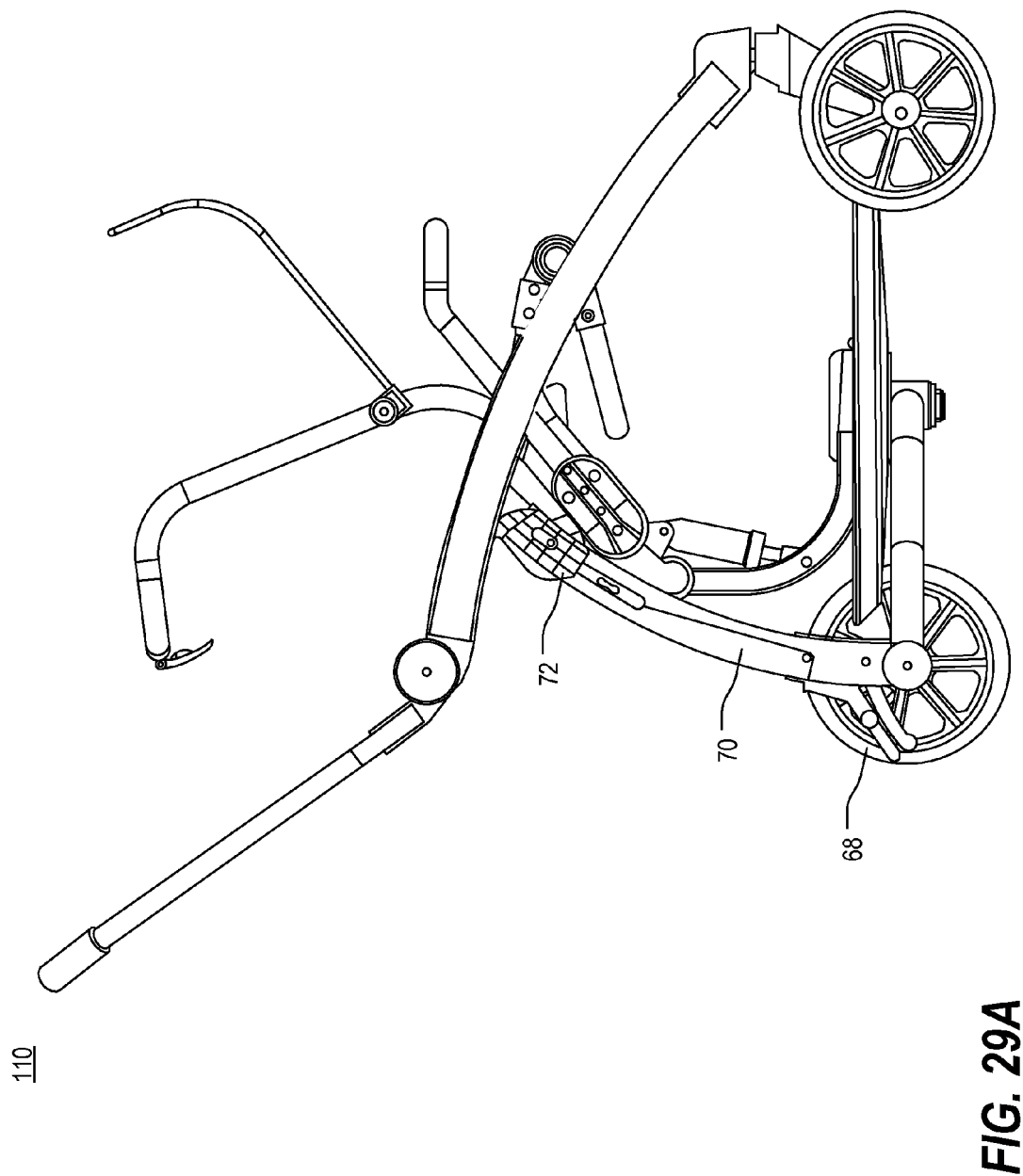
FIGS. 29A and 29B are each a left side cross-sectional view of the stroller depicted in FIG. 28A, taken along line 29.
Figure 29B:
Figure 30A:
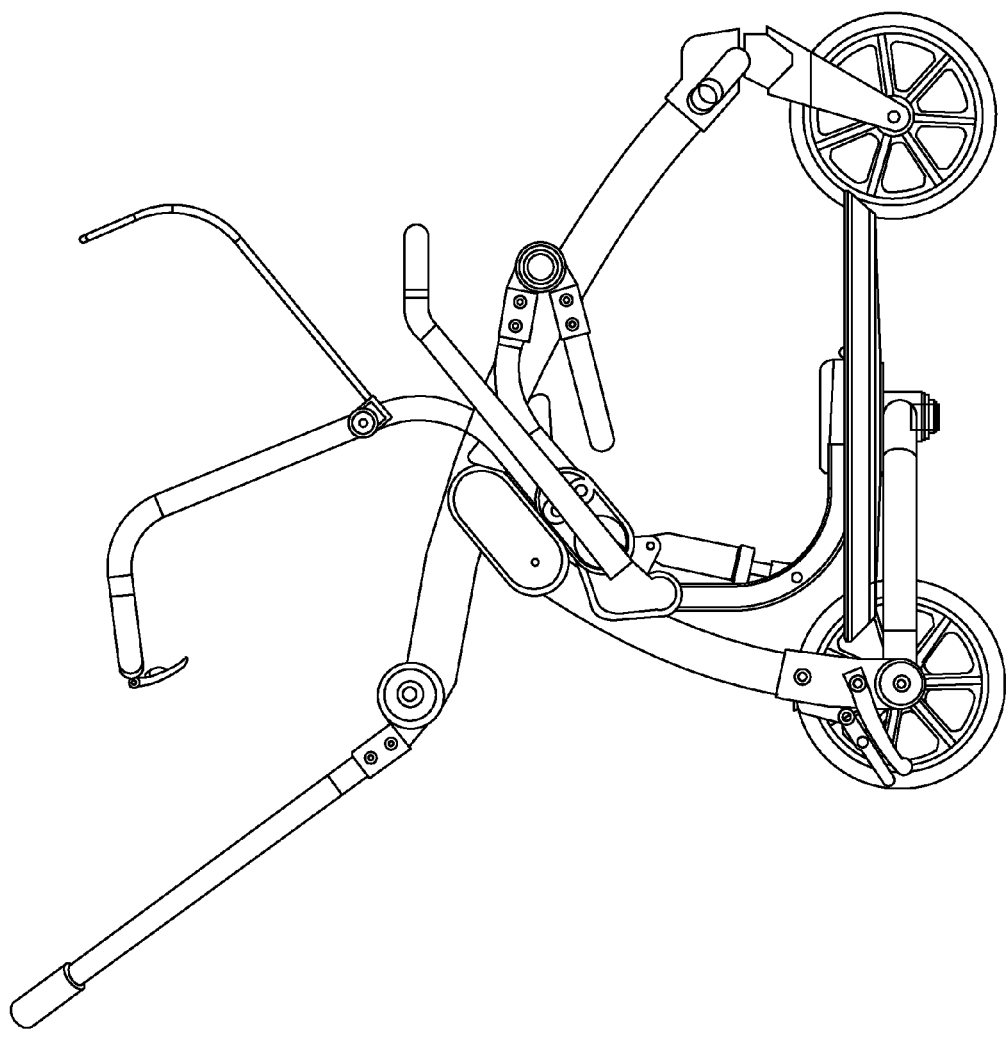
FIGS. 30A and 30B are each a left side cross-sectional view of the stroller depicted in FIG. 28A, taken along line 30.
Figure 30B:
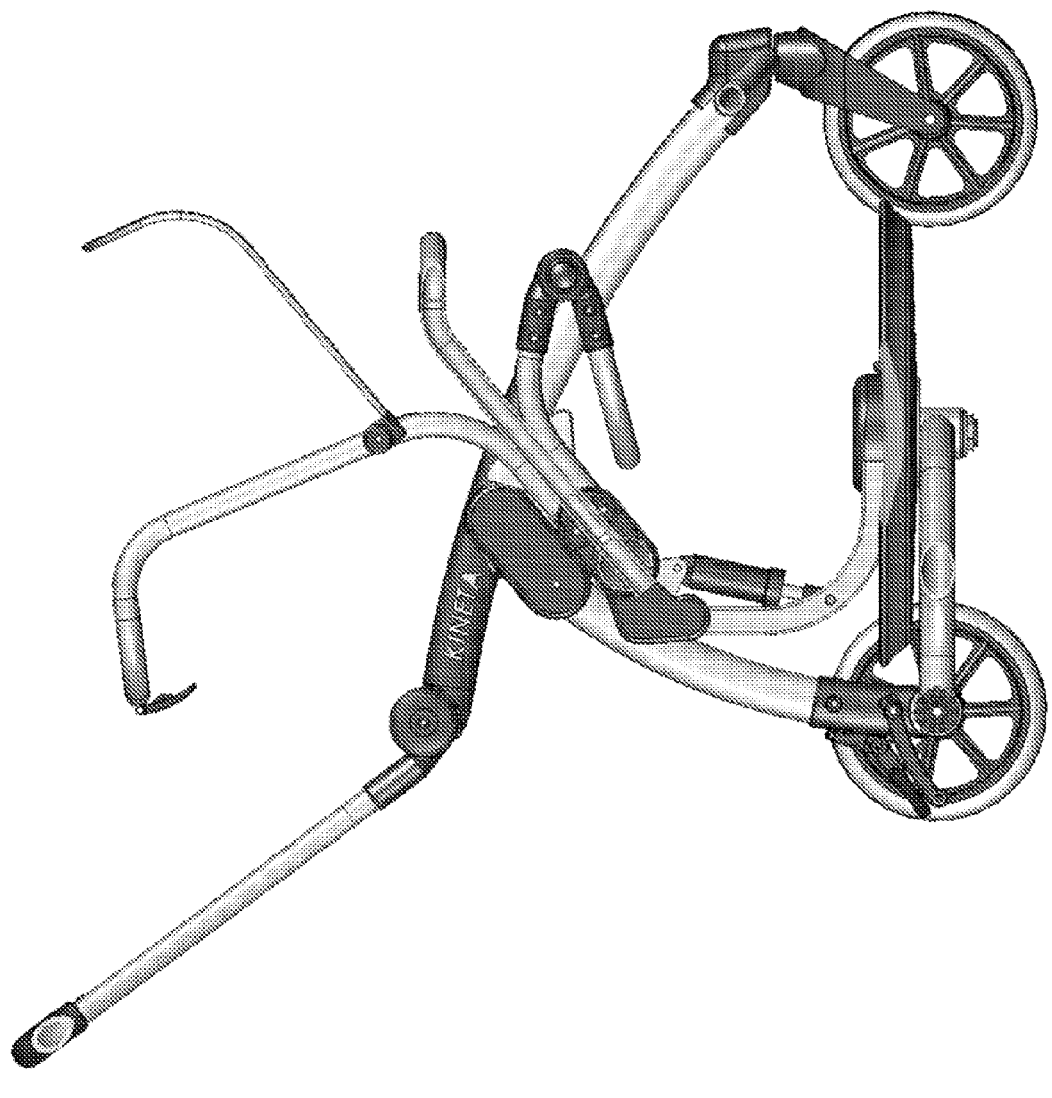
Figure 31A:
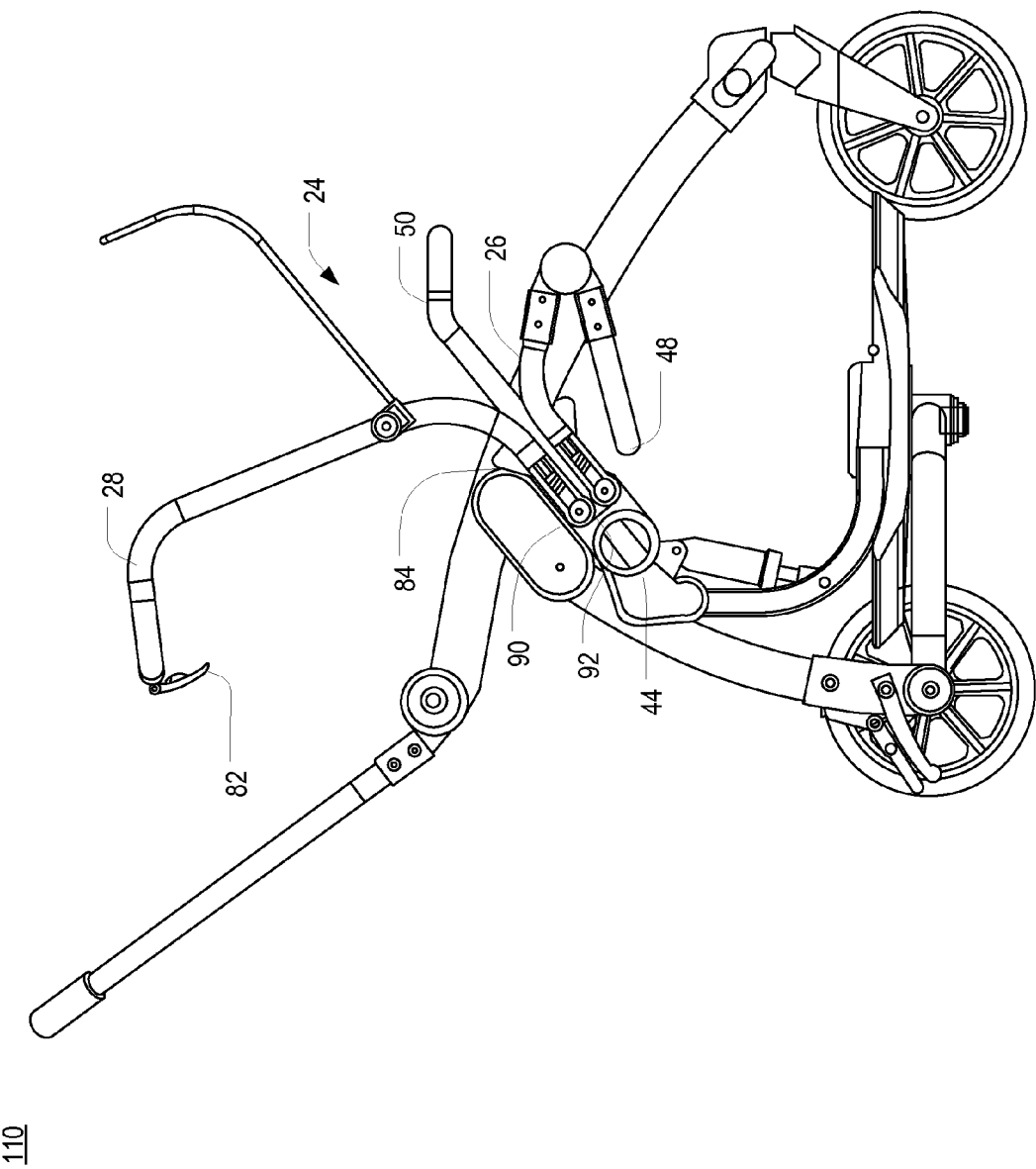
FIGS. 31A and 31B are each a left side cross-sectional view of the stroller depicted in FIG. 28A, taken along line 31.
Figure 31B:
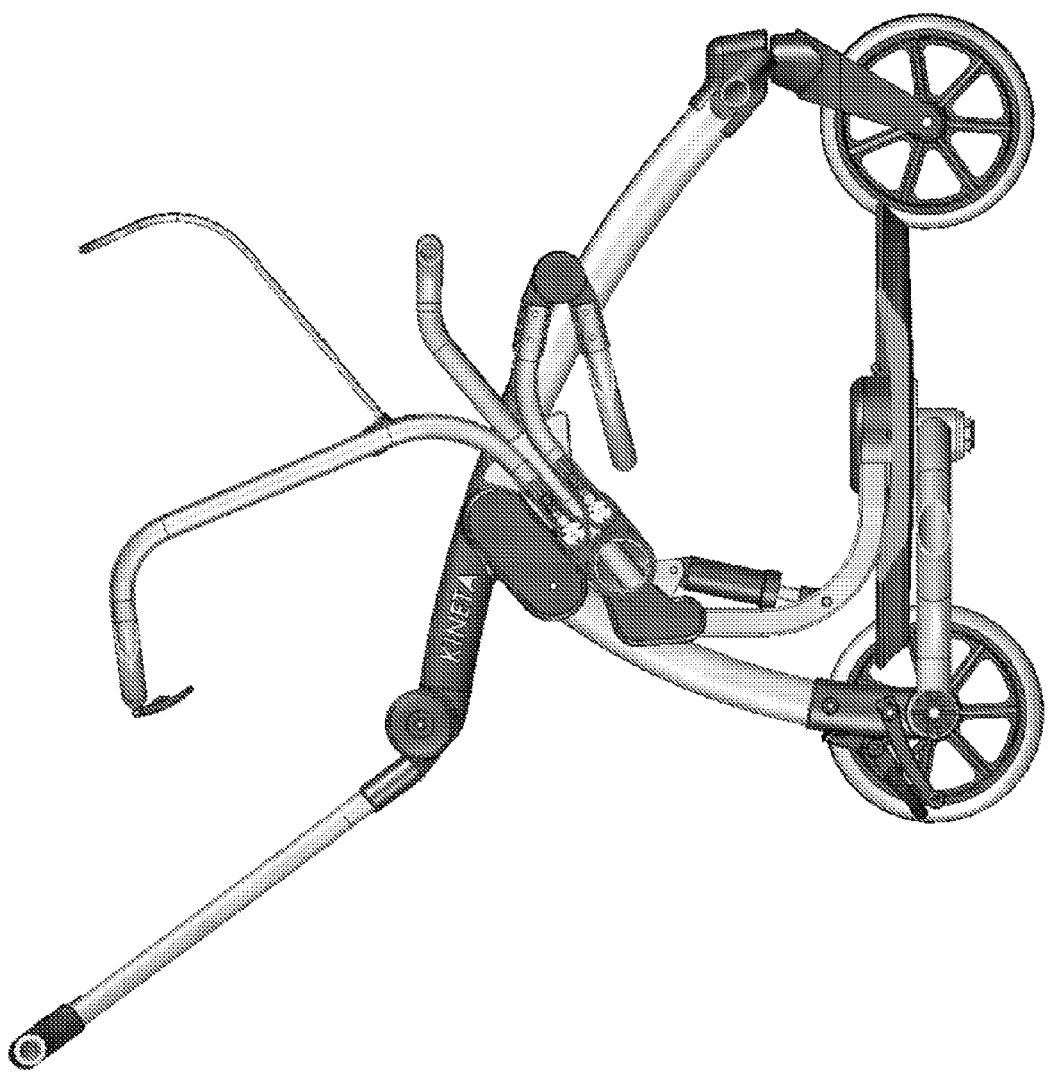
Figure 32A:
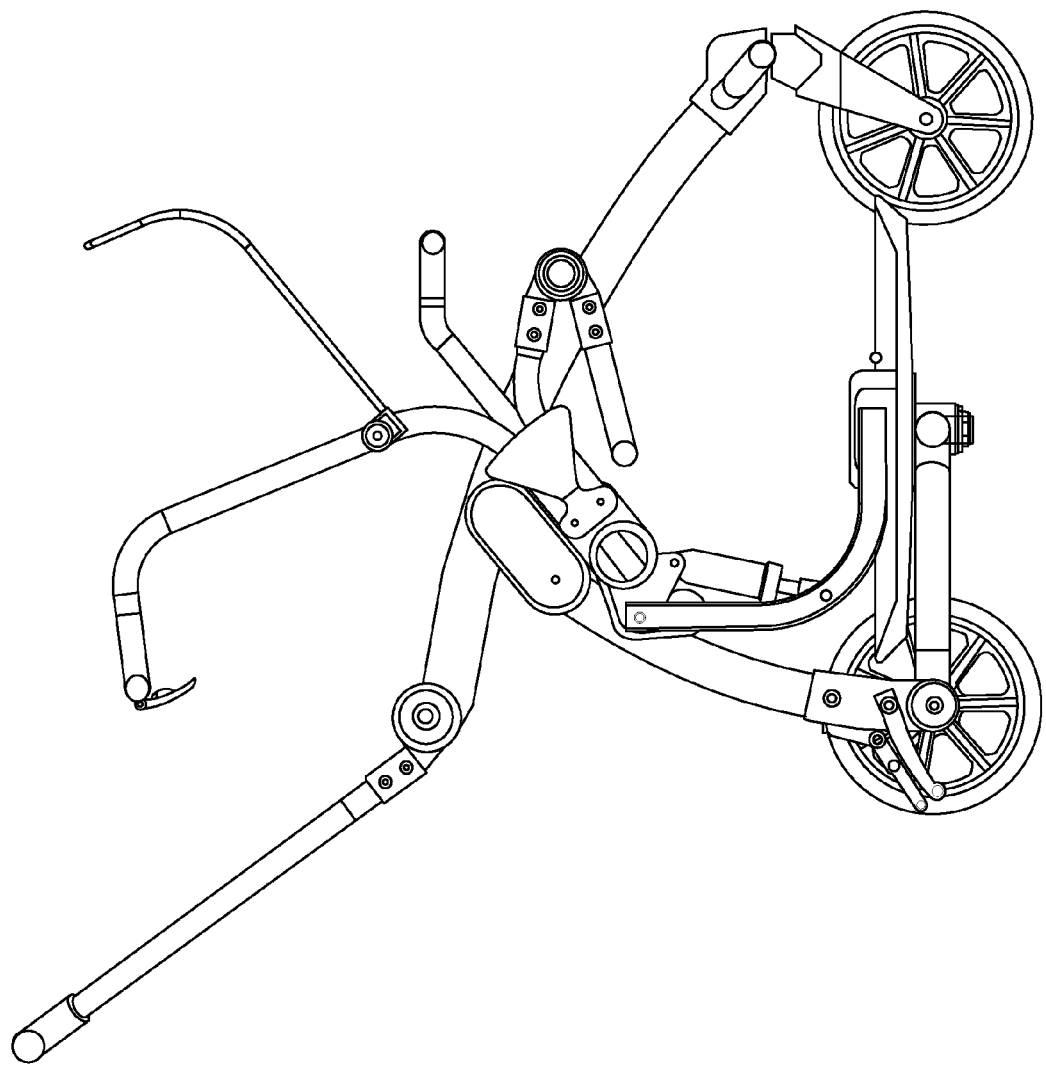
FIGS. 32A and 32B are each a left side cross-sectional view of the stroller depicted in FIG. 28A, taken along line 32.
Figure 32B:
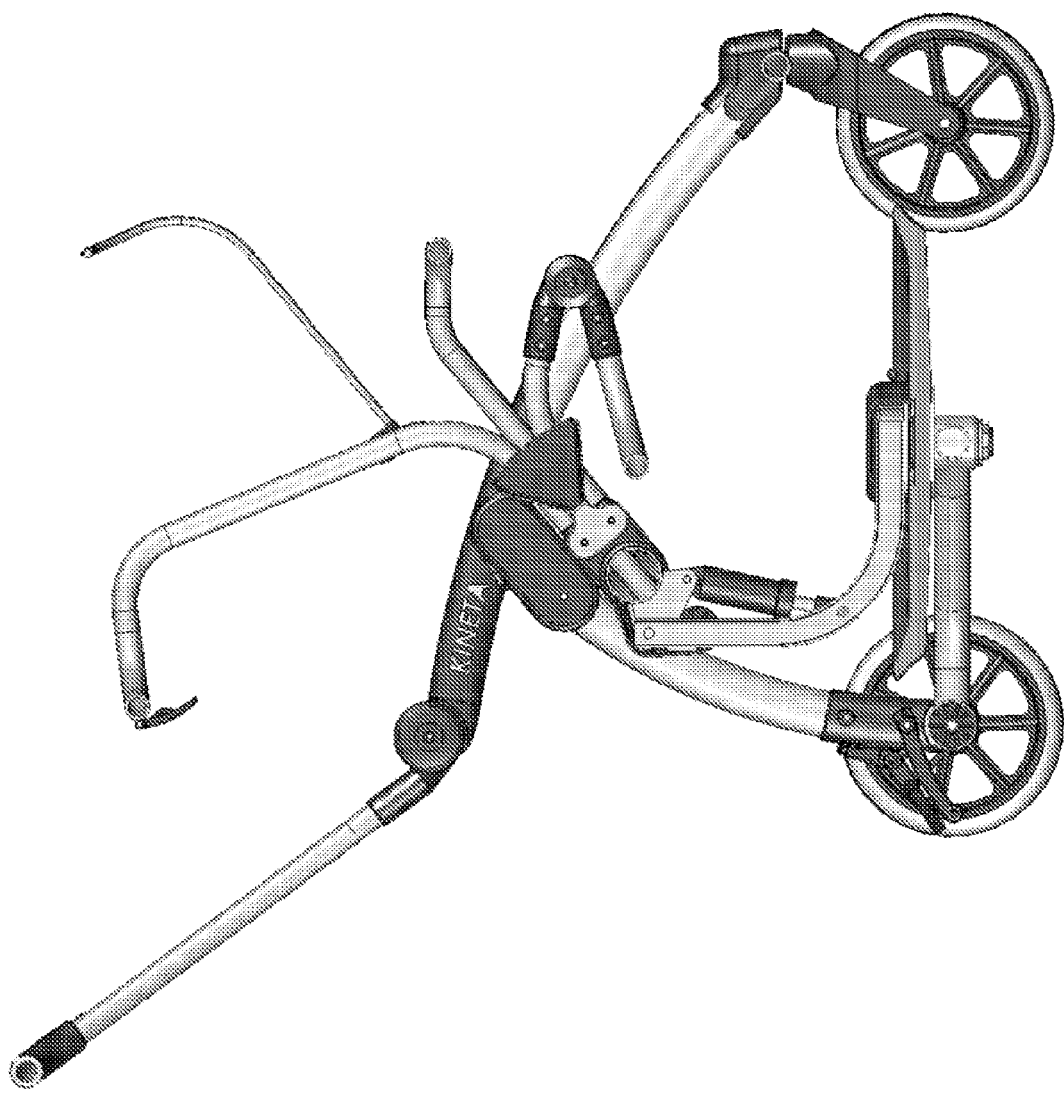
Figure 33A:
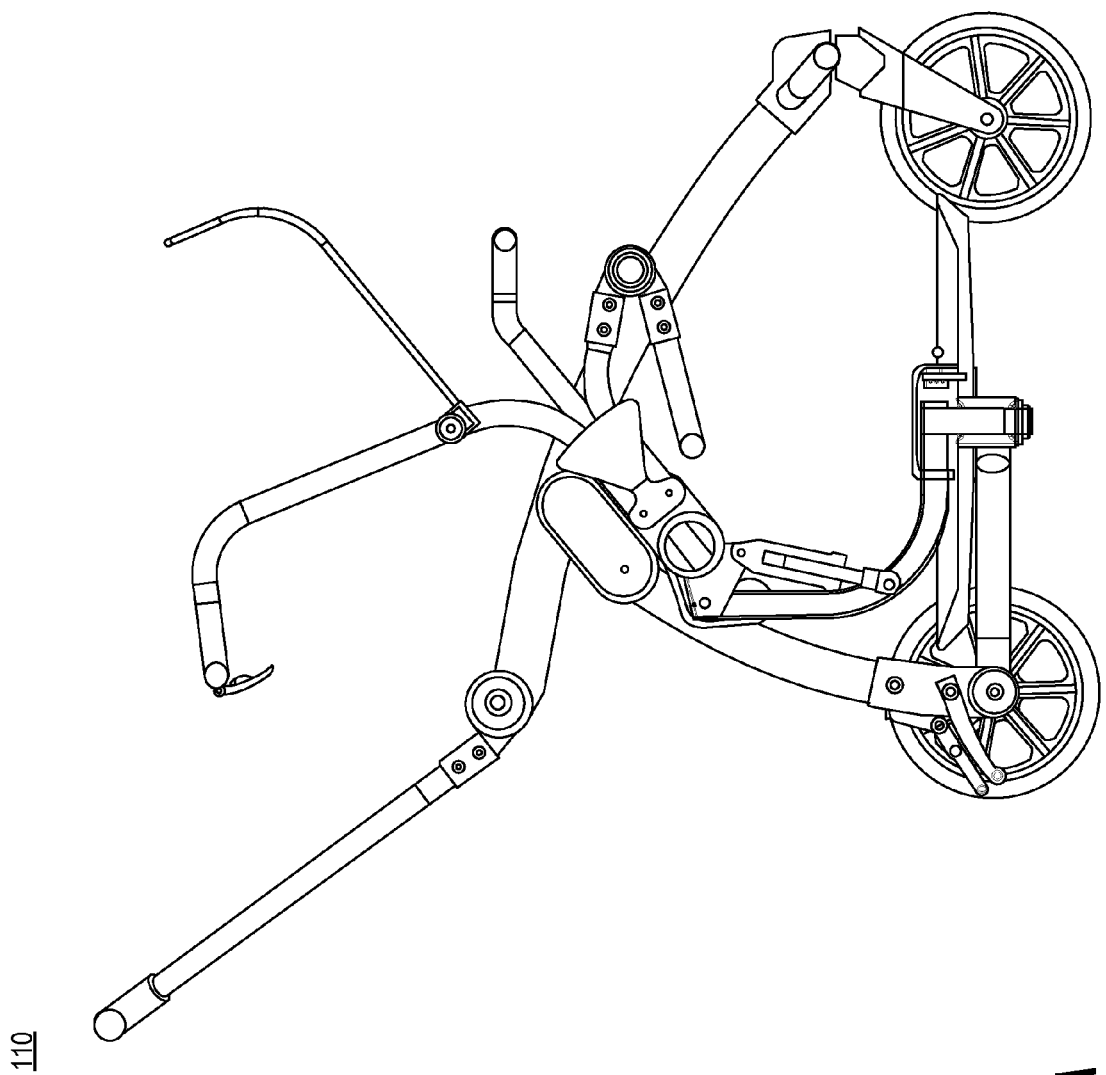
FIGS. 33A and 33B are each a left side cross-sectional view of the stroller depicted in FIG. 28A, taken along line 33.
Figure 33B:
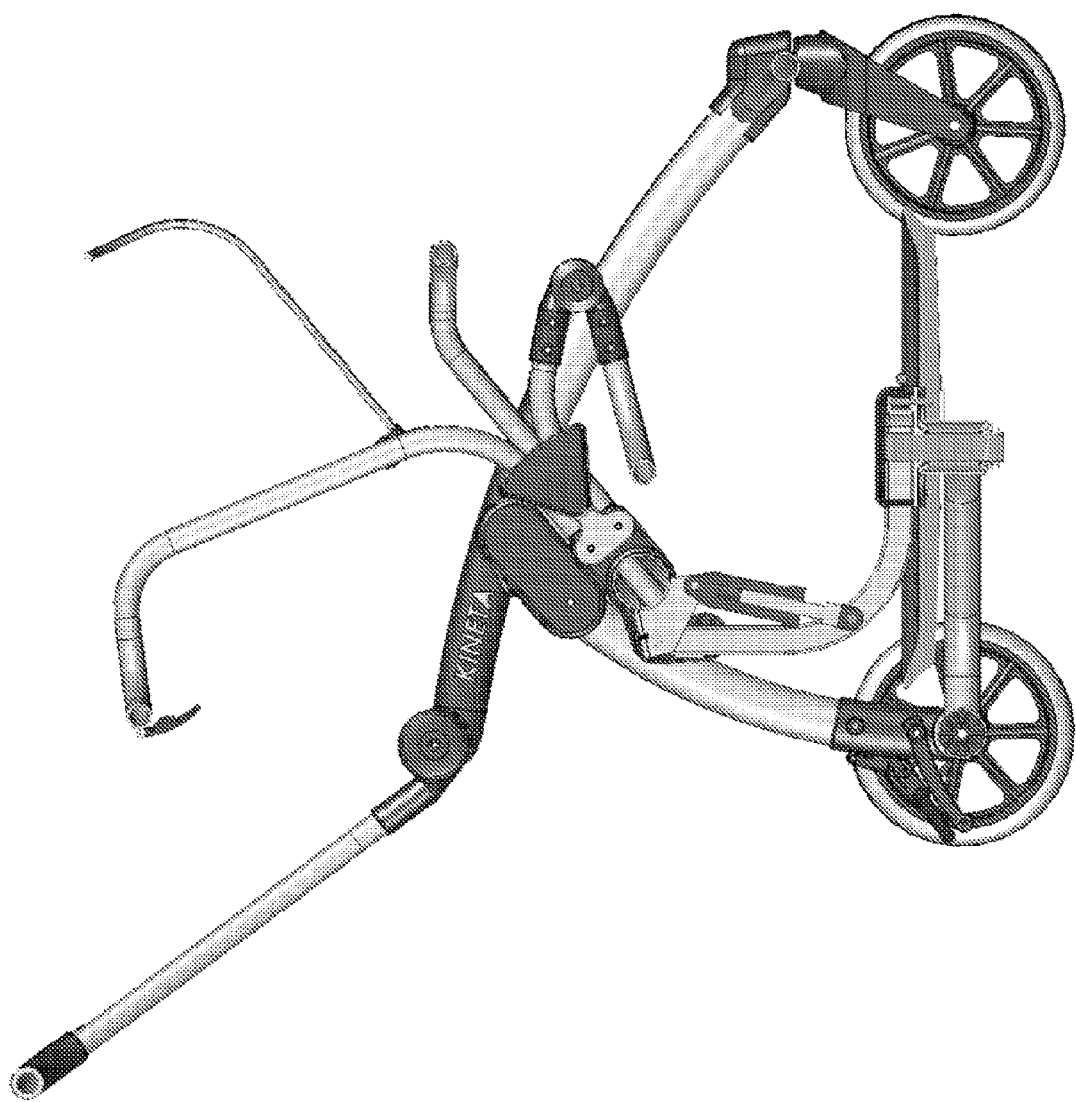

Each of the seat base portion 26 and the seat back portion 28 may include one or more levers, buttons or the like that, upon pressing or lifting, permits the respective component of the seat 24 to be pivoted. For instance, as shown in FIG. 27 and FIG. 31A, the seat base portion 26 may include one or more seat base buttons 84 that, when pressed, actuate the release of lower catches 92 at either side of the seat 24 to permit the seat base portion to be pivoted to a different position. Similarly, the seat back portion 28 may include a seat back lever 82 that, when pulled, actuates the release of upper catches 90 at either side of the seat 24 to permit the seat back portion 28 to be pivoted to a different position. The lower catches 92 and the upper catches 90 may each be configured to be spring-biased such that actuation of the respective seat base buttons 84 or seat back lever 82 enables the respective seat component to be pivoted. Subsequent release of the respective seat base button 84 and seat back lever 82 returns the respective lower catches 92 and upper catches 90 to at-rest positions, thereby preventing the respective seat component associated therewith from further pivoting movement. It is also contemplated that the seat base button 84 and the seat back lever 82 may be configured to attach to cables that separately connect each of the seat base button 84 and the seat back lever 82 with the corresponding lower and upper catches 92,90. In this regard, actuation of the seat base button 84 causes cables associated with the seat base portion 26 to release the lower catches 92 and thereby permit pivoting movement of the seat base portion 26. Similarly, actuation of the seat back lever 82 causes cables associated with the seat back portion 28 to release the upper catches 90 and thereby permit pivoting movement of the seat back portion 28.

Figure 24:
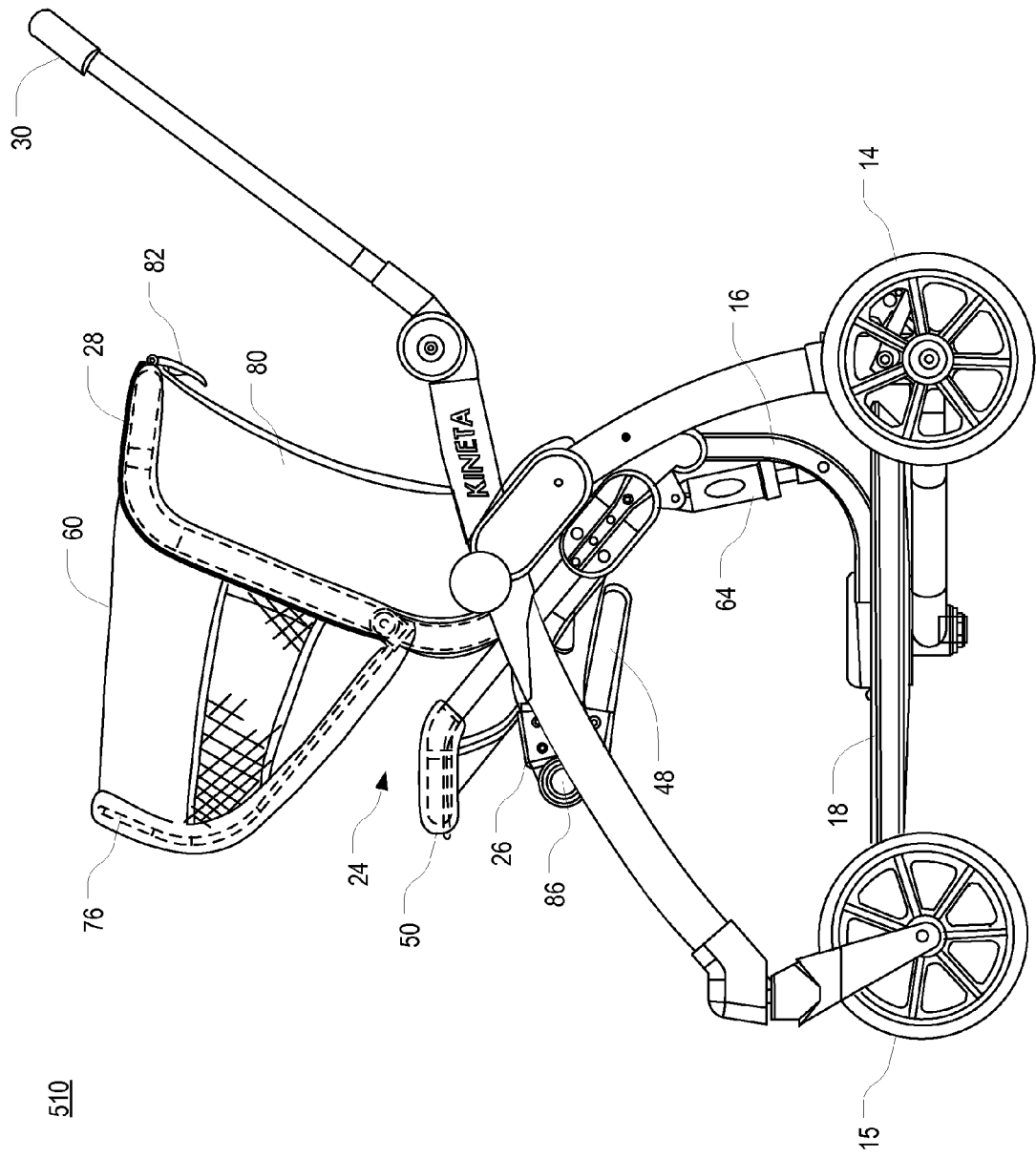
FIG. 24 is a right side view of a sixth embodiment of a stroller in accordance with one or more aspects of the present invention, shown with the seat in a seated configuration.
Figure 25:
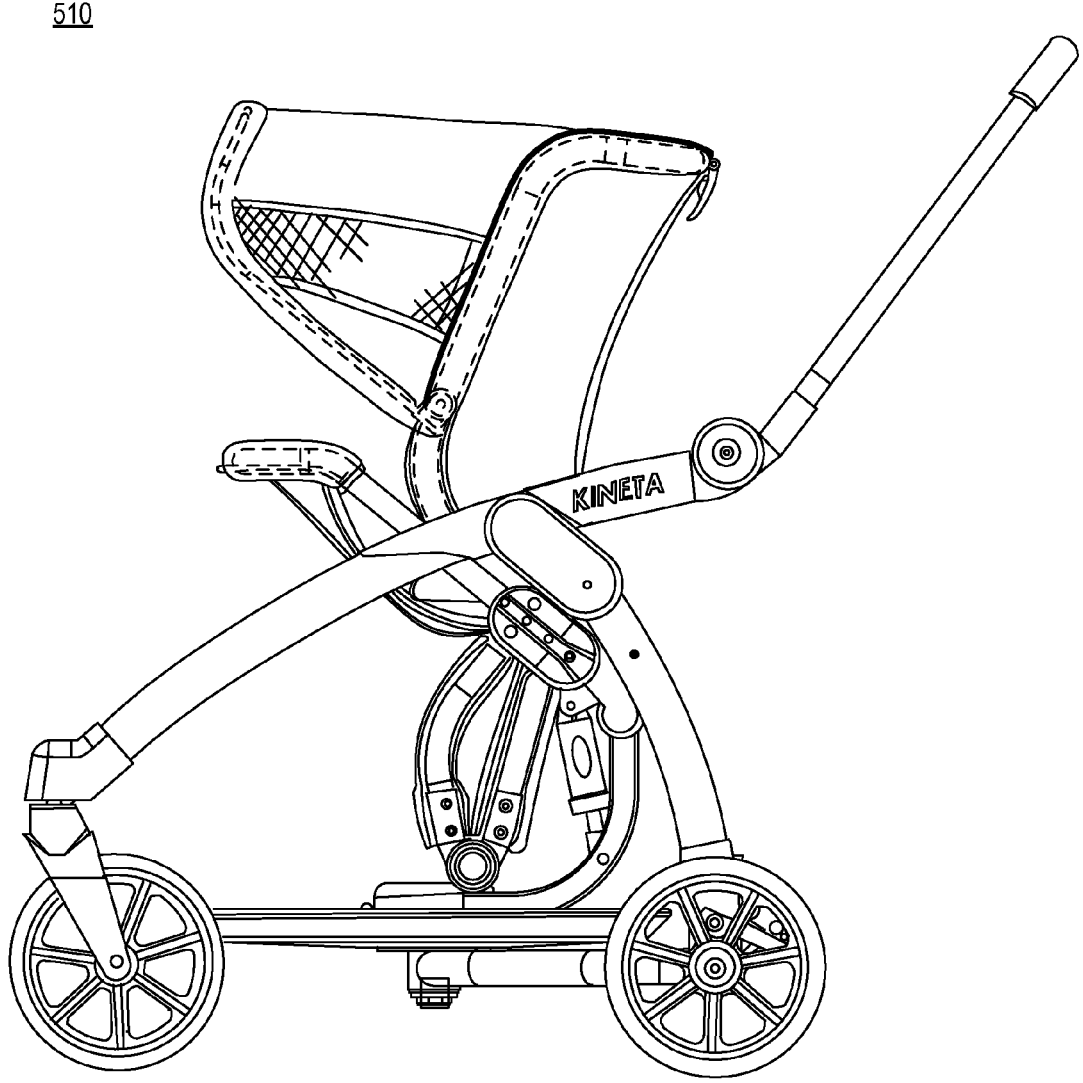
FIG. 25 is a right side view of the stroller depicted in FIG. 24, shown with the seat in a standing configuration.
Figure 26:
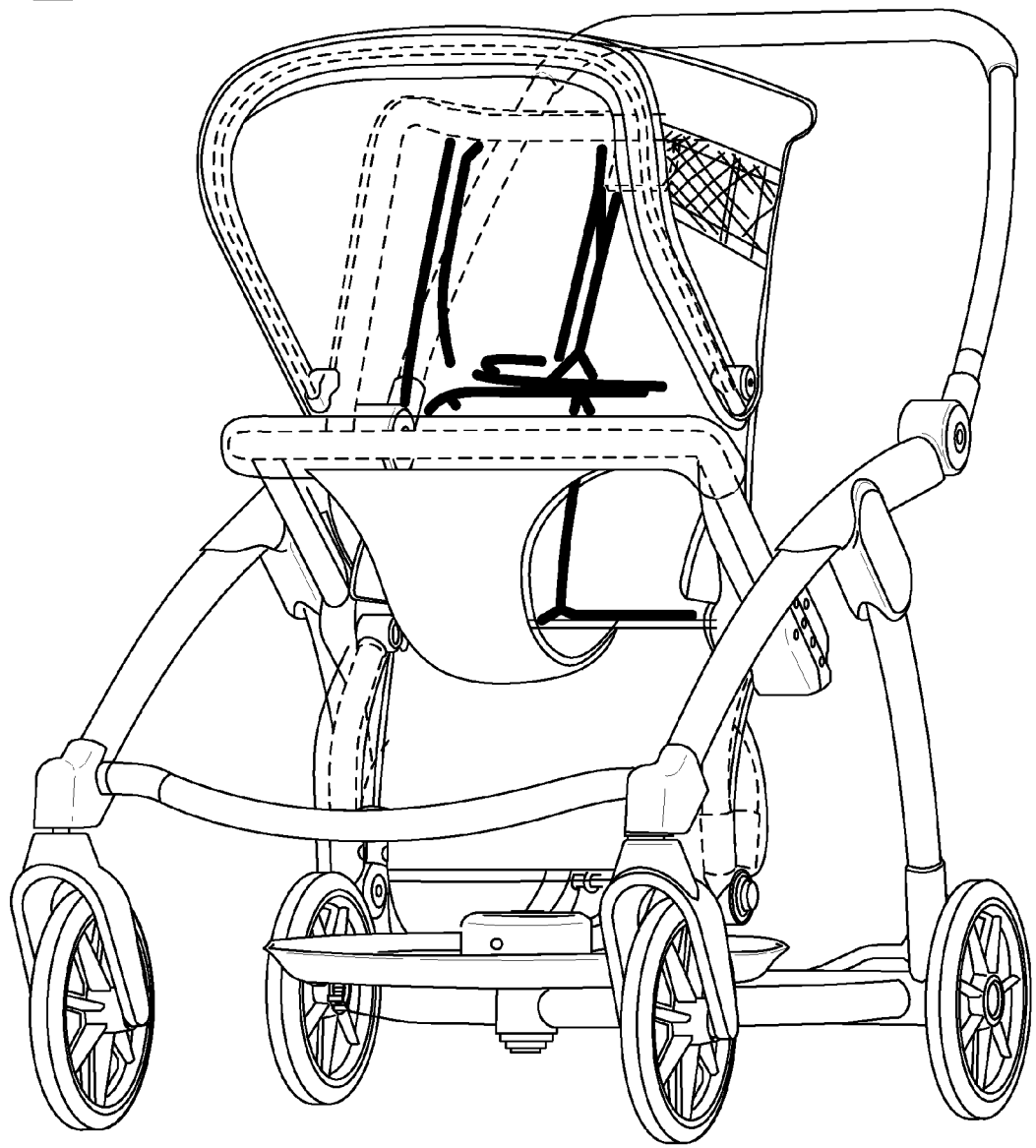
FIG. 26 is a front perspective view of the stroller depicted in FIG. 25.

In addition to the adjustability of the seat base portion 26 and the seat back portion 28 discussed above, the lower leg portion 48 may be pivoted outward to provide additional leg support to a child situated in a stroller. As shown in FIGS. 20-23, the lower leg portion 48 is typically angled generally downward from the seat base portion 26. However, in the event that a particularly young child is situated in the stroller 410, it may be helpful to pivot the lower leg portion 48 outward to provide additional leg support for the child. It is also contemplated that the lower leg portion 48 may be pivoted inward so that it is positioned against the seat base portion 26. In this position, the lower leg portion 48 provides additional space when the seat base portion 26 is to be pivoted downward to convert the seat 24 to a standing configuration. With reference to FIG. 24, an actuation button 86 is preferably located at each seat base joint 74. Pressing the actuation buttons 86 enables the lower leg portion 48 to be pivoted to the desired position. The mechanism permitting the lower leg portion 48 to be pivoted may have any particular design or construction as might be desired.

As shown in FIGS. 7-9 and FIG. 23, the central support 16 is permitted to rotate relative to the frame 12 of the stroller 110,410 about an axis that is generally perpendicular relative to the platform 18. Because the seat 24 is supported by the central support 16, rotation of the central support 16 enables the seat 24 to be rotated as well. Preferably, the lower support assembly 38 is connected to the frame base 20 in such a way that the central support 16 is not permitted to rotate freely. In this regard, the stroller 110,410 may include a latch or lock 94 to prevent the central support 16 from rotating freely. In order to rotate the central support 16 to a different position, the latch 94 may be removed or adjusted to permit rotation. Preferably, the central support 16 is capable of providing 360 degrees of rotation about the generally vertical axis, thereby permitting the seat 24 to face any direction as might be desired. In at least some embodiments, a plurality of preset rotational orientation settings are provided, thereby permitting a user to "lock" the central support 16, and thus the seat 24 and a child carried therein, in a desired rotational orientation. Moreover, because the tray bar 50 is carried by the seat 24, the tray bar 50 is positioned in front of a child regardless of the direction that the seat 24 is facing. Advantageously, the central support 16 may be rotated while the seat 24 is in either of the standing configuration or the seated configuration. Furthermore, in at least some embodiments, it is also possible to rotate the central support 16 to a different position while a child is situated in the stroller 110,410. While not depicted in the drawings, in at least some embodiments it is also contemplated that the seat 24 may be configured to rotate about an axis defined by the central support 16. In this regard, the central support 16 and the platform 18 may remain stationary while the seat 24 is permitted to be rotated to face different directions.

Figure 5:
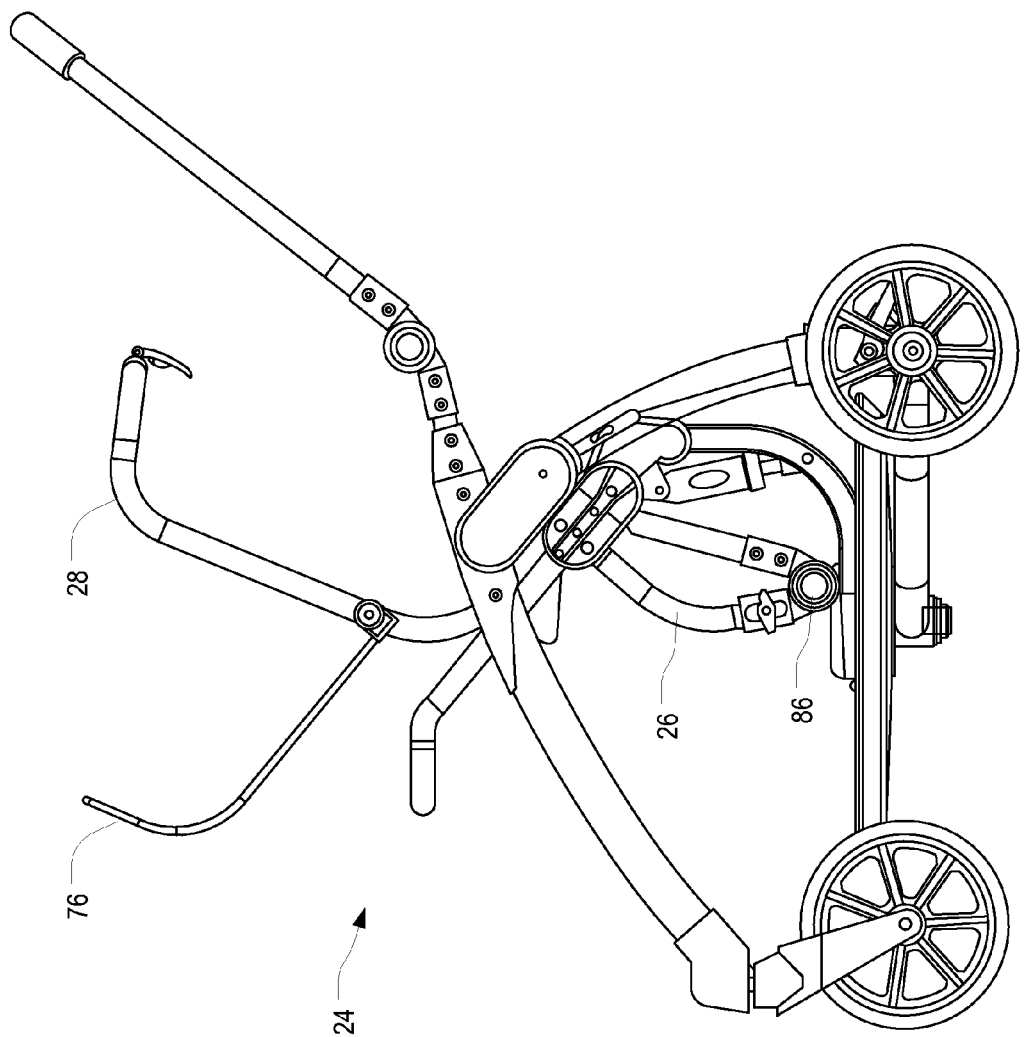
FIG. 5 is a right side elevational view of a second embodiment of a stroller in accordance with one or more aspects of the present invention, shown with the seat arranged in a standing configuration.
Figure 6:
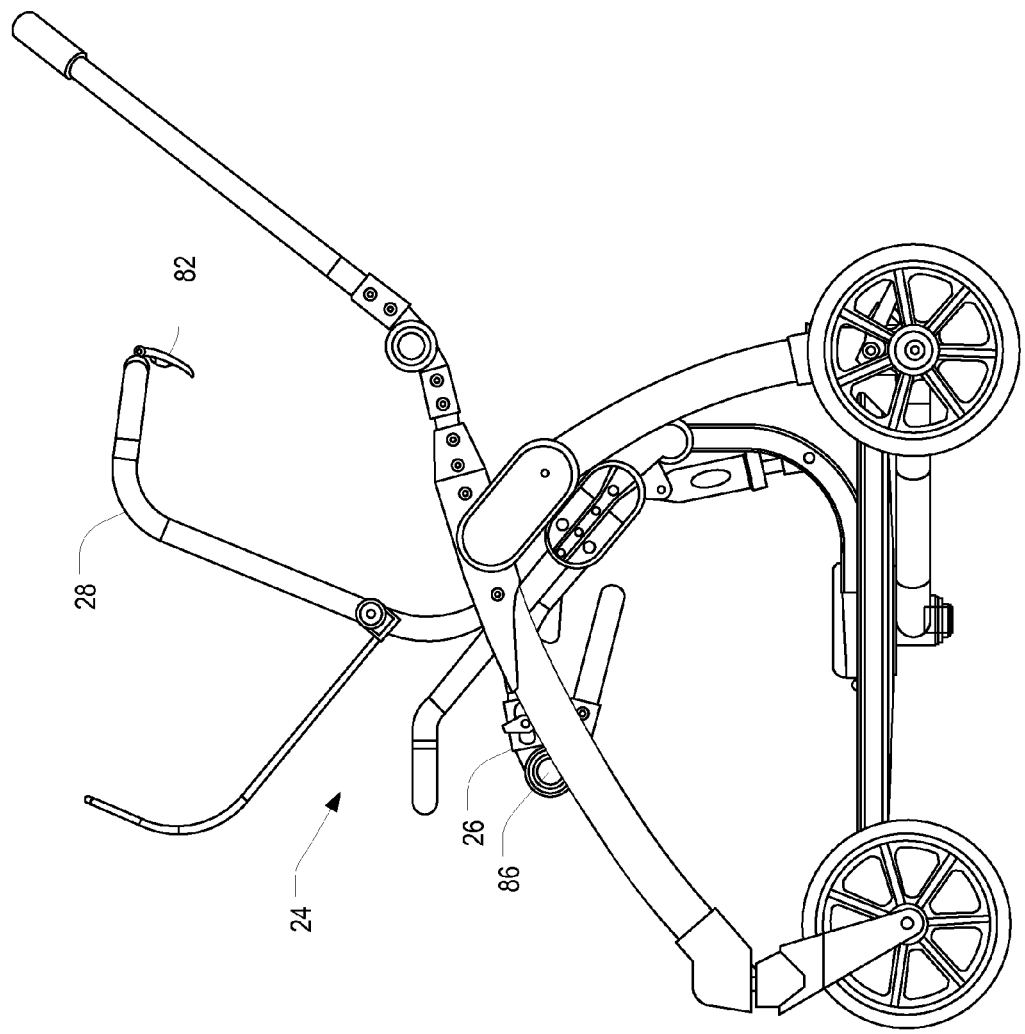
FIG. 6 is a right side elevational view of the stroller depicted in FIG. 5, shown with the seat arranged in a seated configuration.
Figure 7:
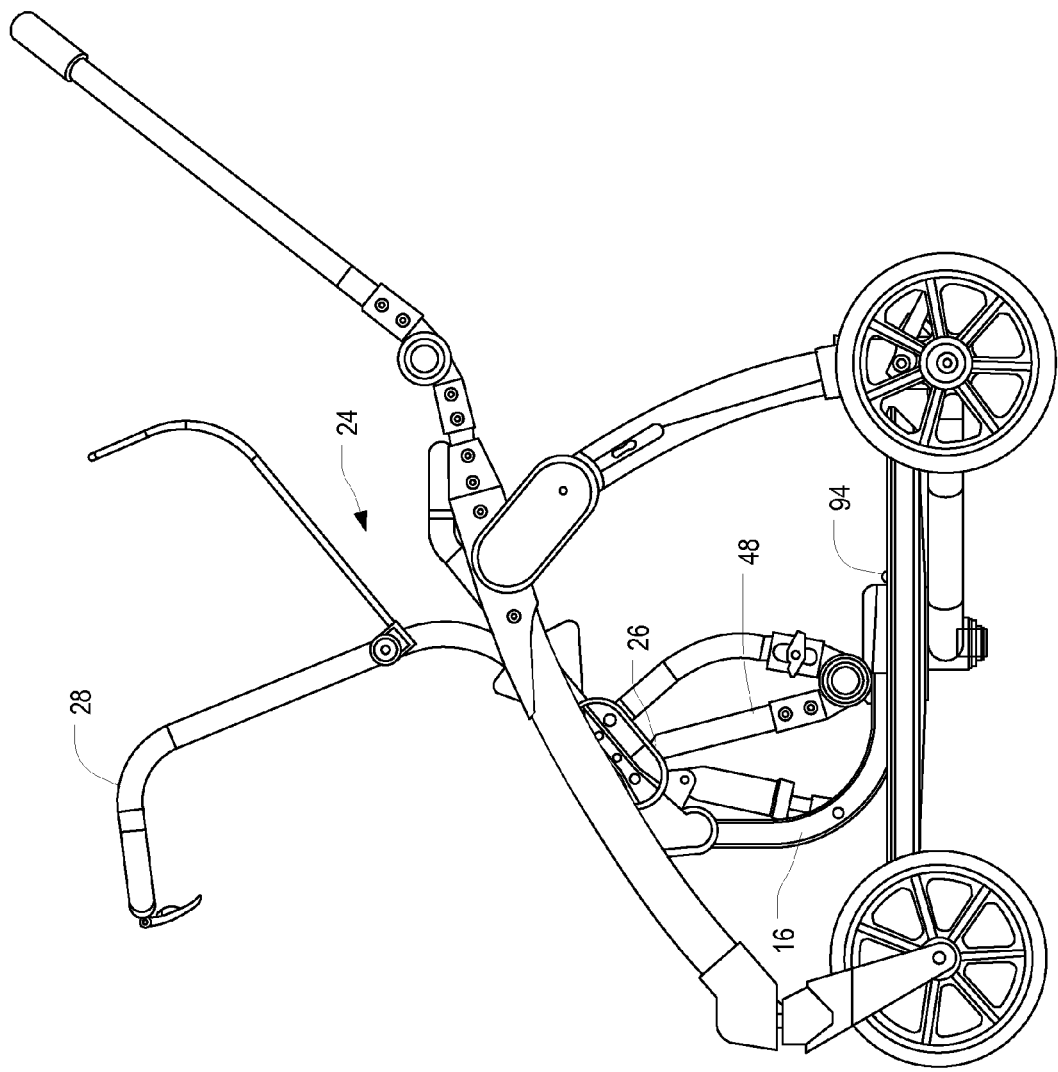
FIG. 7 is a right side elevational view of the stroller depicted in FIG. 5, shown with the seat arranged in the standing configuration and rotated 180 degrees.
Figure 8:
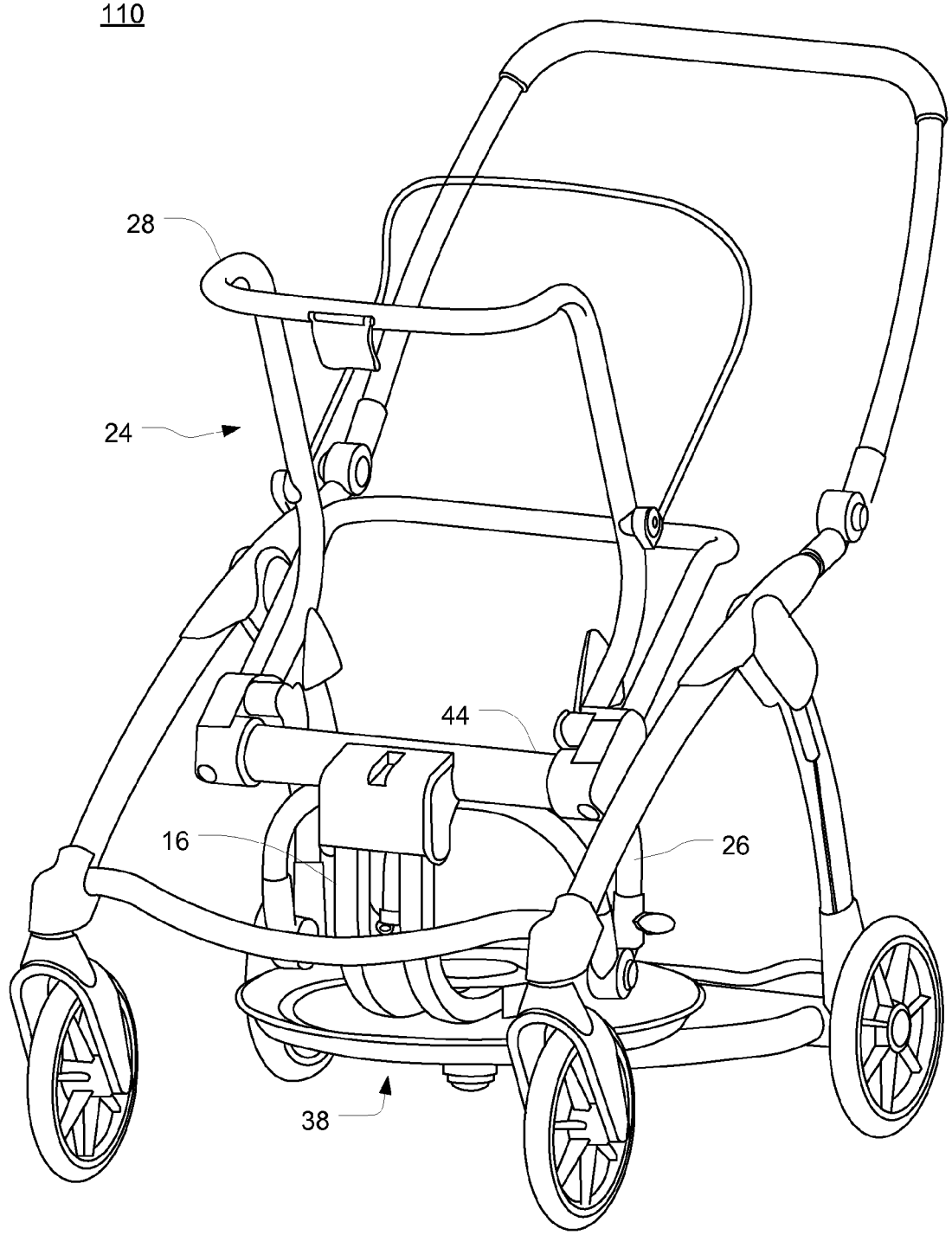
FIG. 8 is a front perspective view of the stroller depicted in FIG. 5, shown with the seat in the standing configuration and rotated 180 degrees.
Figure 9:
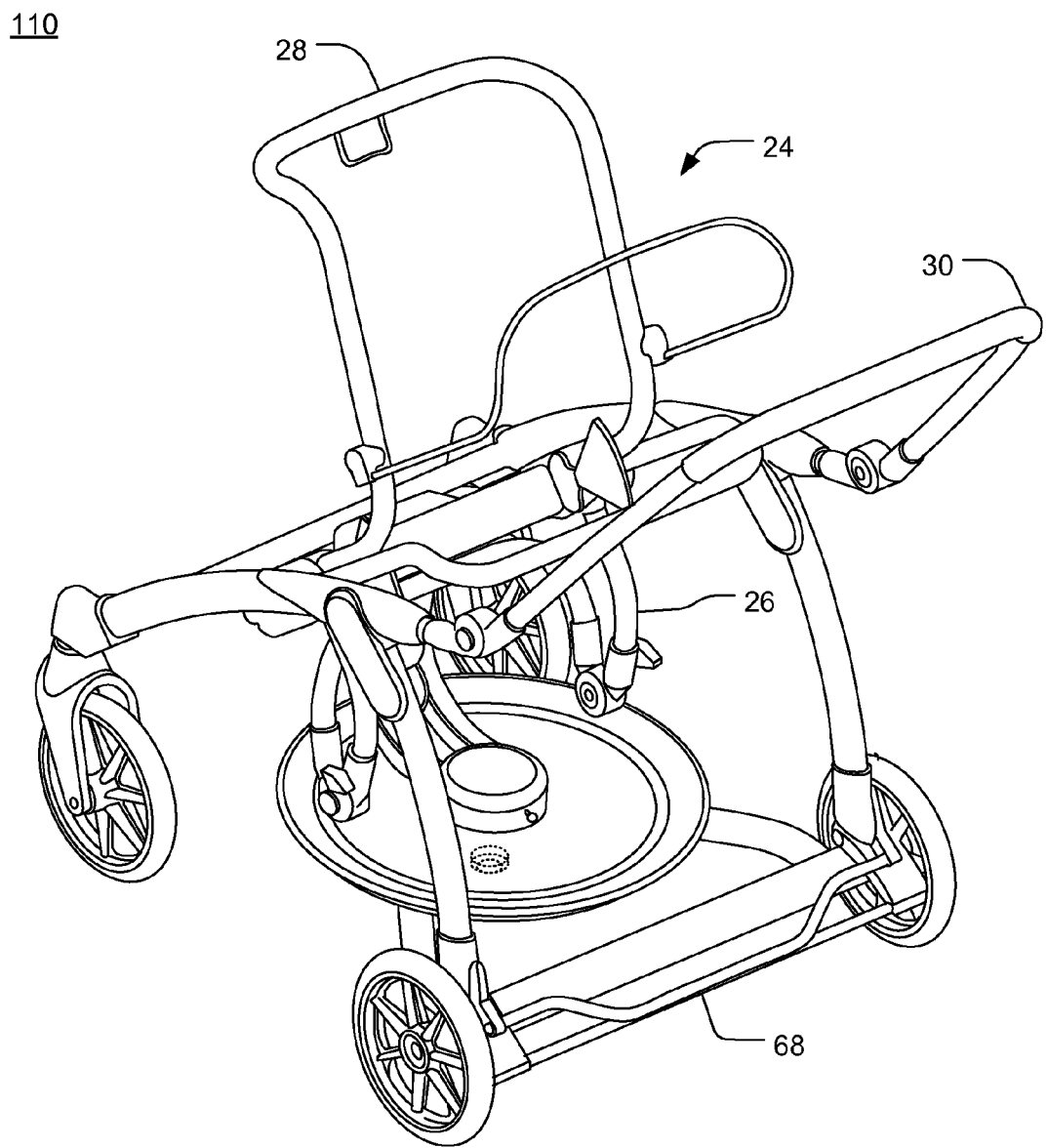
FIG. 9 is a rear perspective view of the stroller depicted in FIG. 5, shown with the seat in the standing configuration and rotated 180 degrees.
Figure 10:
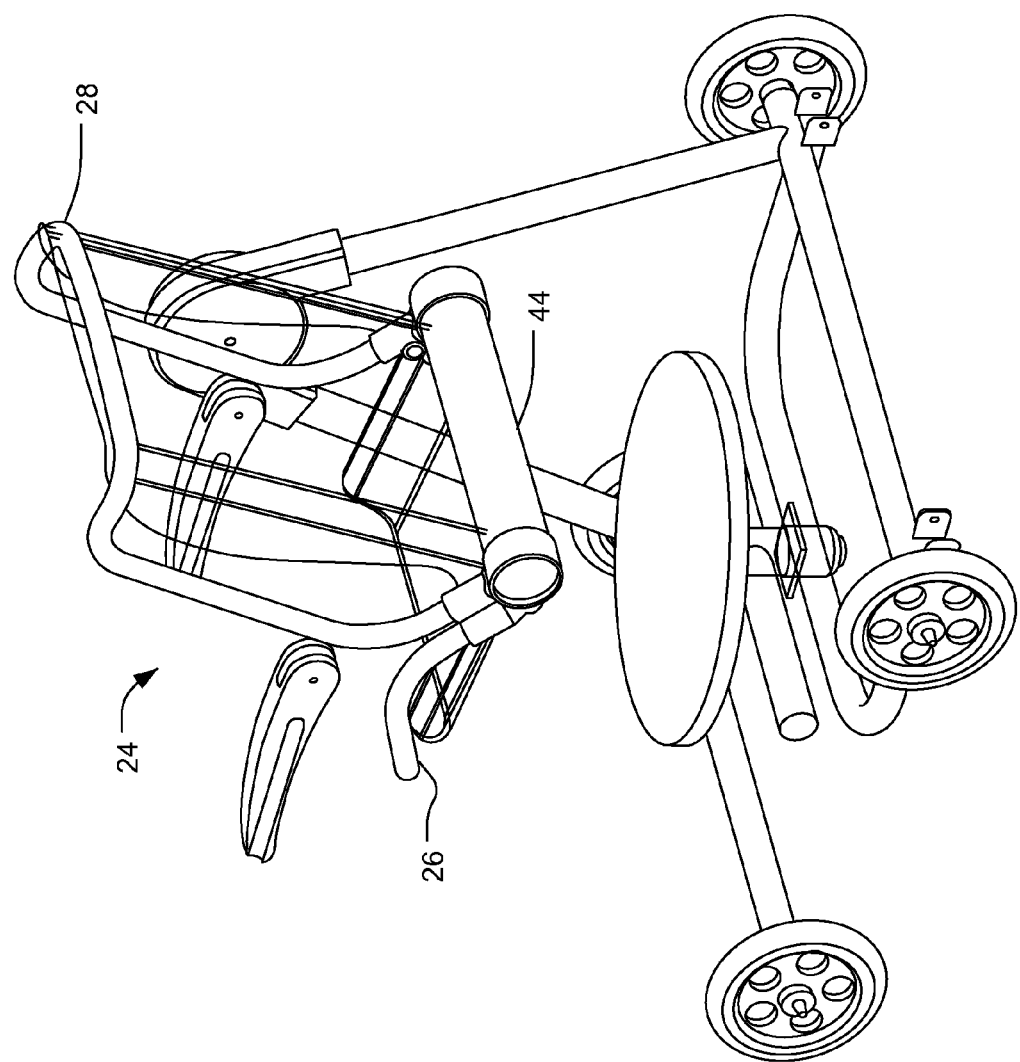
FIG. 10 is a rear perspective partial cutaway view of a third embodiment of a stroller in accordance with one or more aspects of the present invention.
Figure 11:
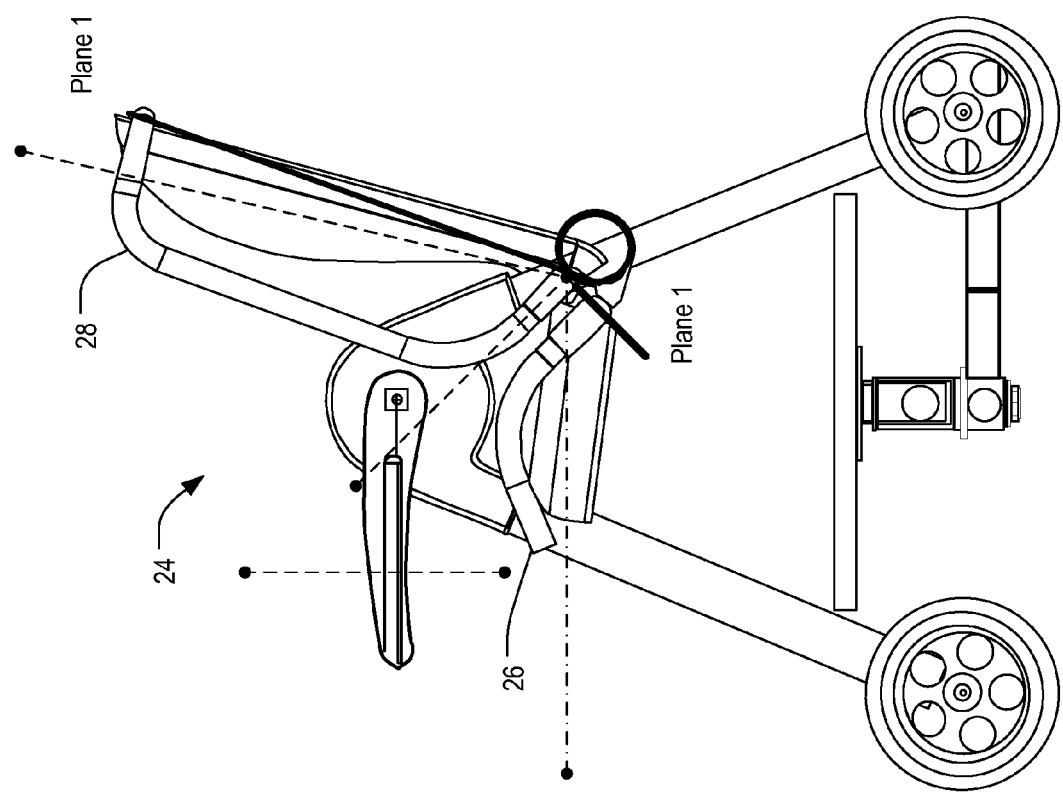
FIG. 11 is a side partial cutaway view of the stroller depicted in FIG. 10, shown with the seat in the seated configuration.

As shown in FIG. 5, the stroller 110 may include a canopy support 76 that is pivotable away from the seat back portion 28. In this regard, the canopy support 76 may be pivoted away from the seat back portion 28 to a fully extended position, whereby the canopy support 76 may support a canopy, one or more examples of which may be illustrated herein, that fully covers a child situated in the stroller 110. Additionally, the canopy support 76 may be pivoted toward the seat back portion 28 to a fully retracted position, whereby a canopy supported by the canopy support 76 does not cover a child situated in the stroller 110. Advantageously, the canopy support 76 may also be pivoted to other positions between the fully extended position and the fully retracted position so that a canopy supported by the canopy support 76 partially covers a child situated in the stroller 110. Furthermore, the canopy 76 is preferably supported by the seat 24 such that rotation of the seat 24 results in the canopy support 76, and the canopy carried thereon, being rotated as well.

Figure 21:
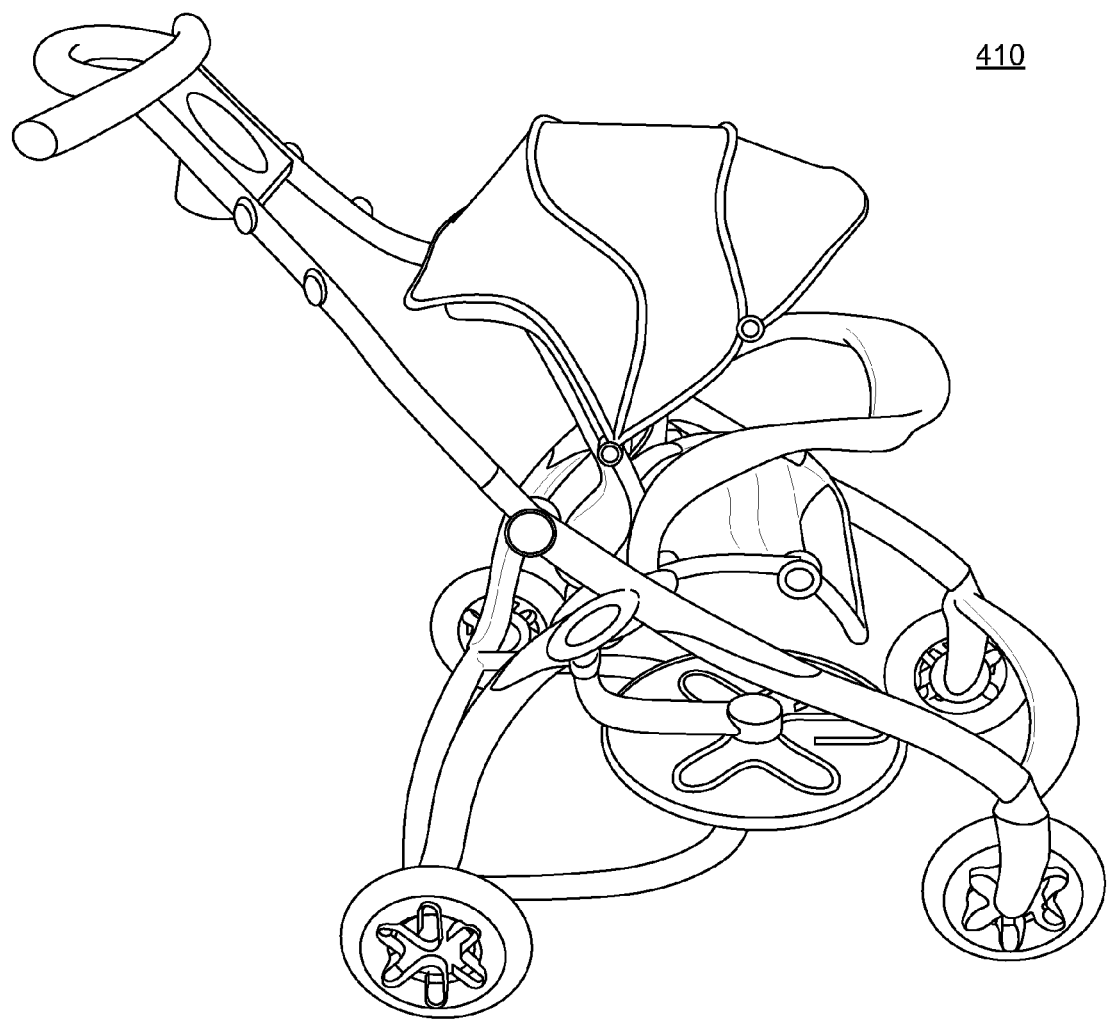
FIG. 21 is a side perspective view of the stroller depicted in FIG. 20, shown with the seat in the seated configuration and the canopy extended.
Figure 22:
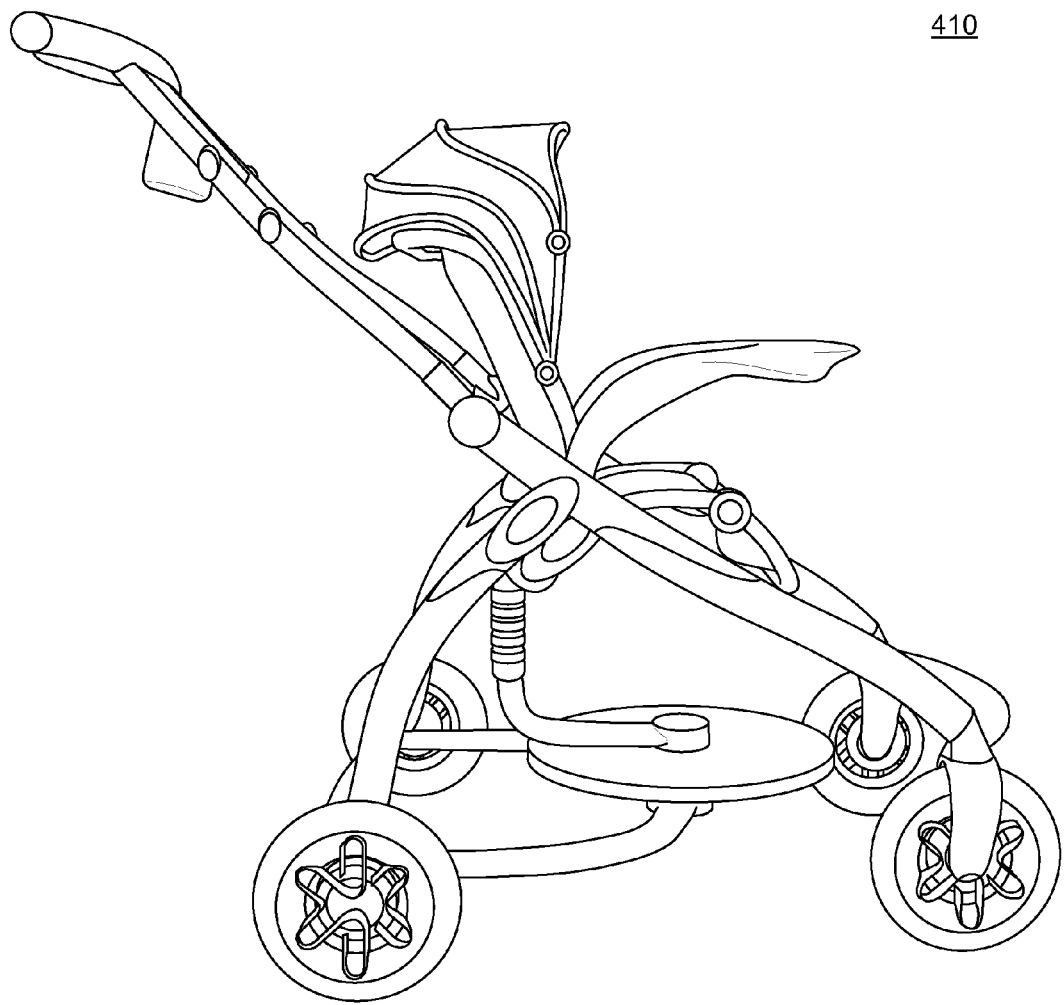
FIG. 22 is a side perspective view of the stroller depicted in FIG. 20, shown with the seat in the seated configuration and the canopy partially retracted.
Figure 23:
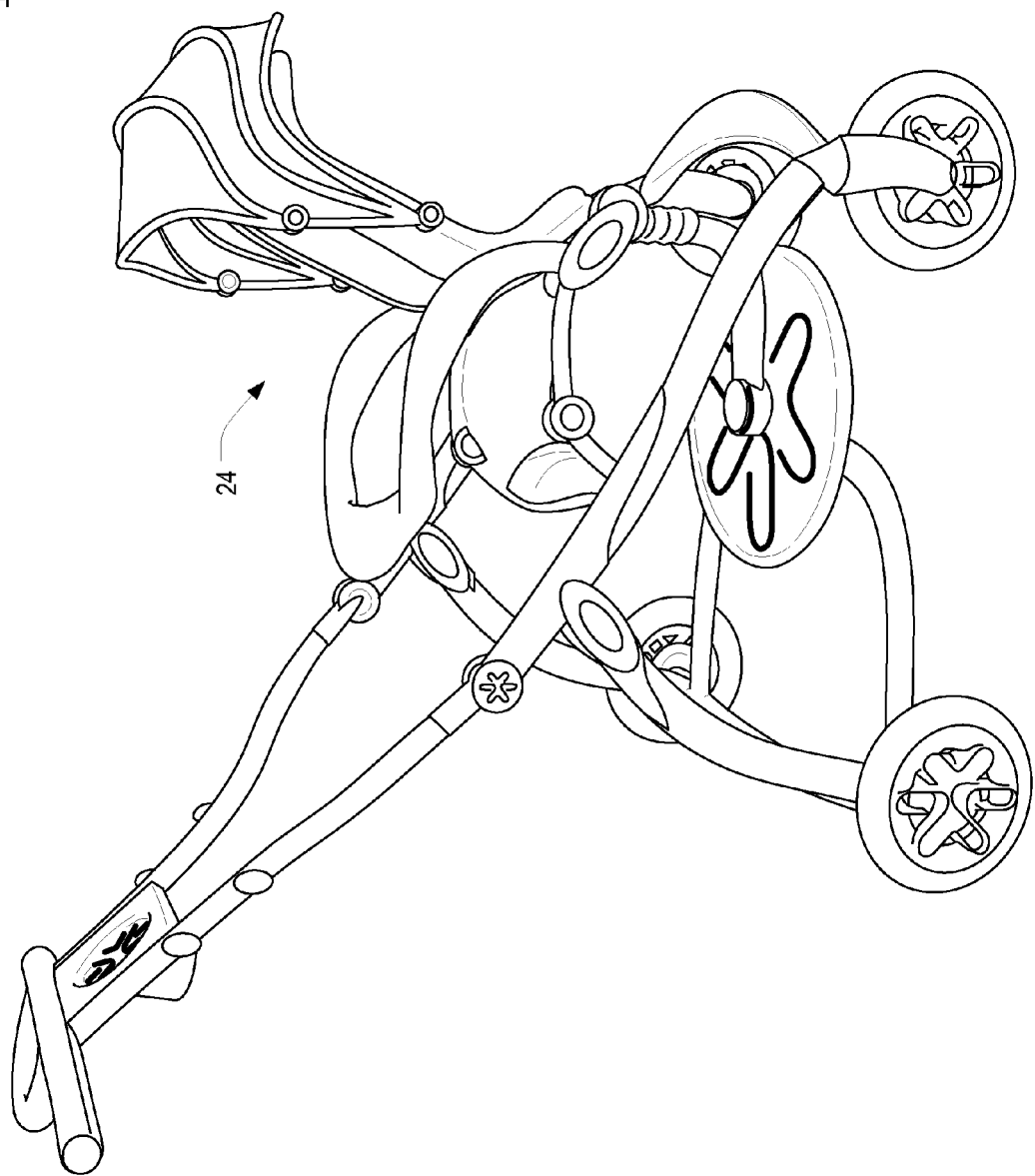
FIG. 23 is a right side perspective view of the stroller depicted in FIG. 20, shown with the seat in the seated configuration, the canopy partially retracted, and the seat rotated 180 degrees.

Now turning to FIGS. 20-23 and FIGS. 24-27, other features of the present invention are shown. In particular, a canopy 60 may be configured to wrap around the canopy support 76 to extend over the area where the child is situated in the stroller 410,510. In this regard, the canopy 60 can provide additional shelter to a child situated in the stroller 410,510 by shielding the child from wind, rain or sun when the stroller is in use. Advantageously, as the canopy support 76 is configured to be pivotable as discussed above, the canopy 60 may be extended or retracted so that a child situated in the stroller 410,510 may be covered or uncovered as might be desired. FIG. 21 depicts a stroller 410 with the canopy 60 extended, and FIG. 22 depicts a stroller 410 with the canopy 60 partially retracted. As shown in FIGS. 13-16, if the stroller 110 is to be collapsed for storage or travel, the canopy support 76 may be pivoted toward the seat back portion 28 so that a canopy supported thereby may be fully refracted. It will be appreciated that a canopy may likewise be utilized with one or more of the other embodiments shown and described herein.

In another feature shown in FIGS. 20-23 and FIGS. 24-27, the stroller 410,510 may include a front crossbar 62 connected between the side members 22 above the front wheels 15. As with the rear crossbar 36, the front crossbar 62 may provide enhanced structure and greater stability to the stroller 410,510. It will be appreciated that a front crossbar may likewise be provided in one or more of the other embodiments shown and described herein.

In still another feature shown in FIGS. 20-23 and FIGS. 24-27, the stroller may be configured to include a shock absorber or dampener to absorb bumps that may be transmitted through the wheels 14,15 when the stroller 410,510 is in use. The shock absorber 64 may have any particular structure or design as might be desired. As shown in FIGS. 20-23, the shock absorber 64 is configured to be a spring that is integral with the central support 16. As shown in FIGS. 24-27, the shock absorber 64 is a dampening piston that interconnects between the seat 24 and the central support 16. While the shock absorber 64 may be helpful in absorbing shocks and bumps transmitted through the wheels 14,15 when the stroller 410,510 is in use, the shock absorber 64 may simultaneously provide amusement to a child situated in the stroller. In particular, the shock absorber 64 may provide the child with the ability to bounce while restrained in the seat when the stroller 410,510 is in active use.

In another feature, various portions of the stroller 410,510 that are designed for user contact, such as the tray bar 50 and the handle 30, may be composed of a durable plastic material, such as polypropylene.

Figure 16A:
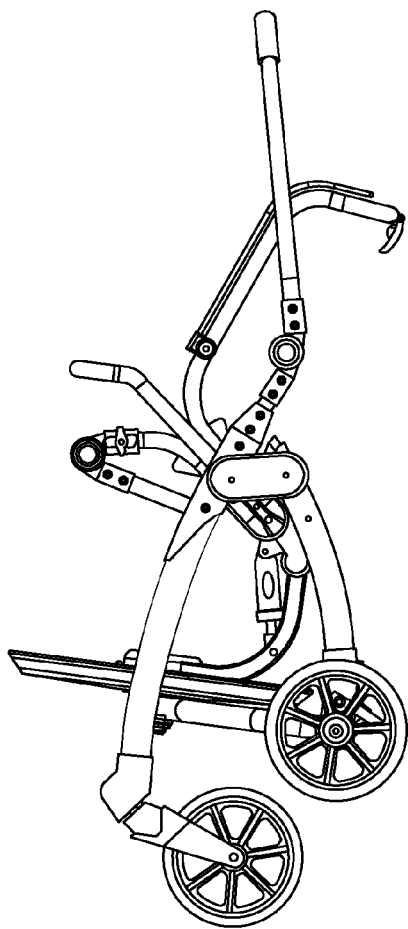
Figure 16B:
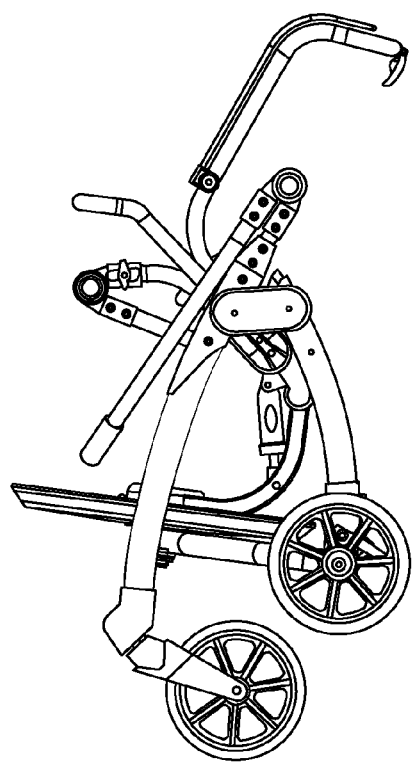

Now turning to FIGS. 13A-16B, a method of collapsing the stroller 110 for storage and portability is shown. In a first step, shown in FIGS. 13A and 13B, the canopy support 76 of the stroller 110 is retracted to lie in a relatively flush position against the seat back portion 28 of the seat 24. In a second step, shown in FIGS. 14A and 14B, the frame 12 is collapsed inward such that the frame base 20, central support 16, rear wheels 14, and seat 24 fold toward the side members 22. The frame 12 folds about the frame joint 40 at each of the two side members 22. Preferably, the frame 12 is configured so that a foot bar 68 is positioned at the rear of the stroller 110 to permit a person to actuate the collapse of the frame 12. As shown in FIG. 27 and FIGS. 28A-33B, the foot bar 68 may be attached to cables 70 extending within the interior of the respective side members 22 on either side of the stroller 110,510 and ending at the frame joints 40. In this regard, pressing the foot bar 68 downward actuates the collapse of the stroller 110,510 by causing the cables 70 to release a frame latch 72 at each of the respective frame joints 40, thereby permitting the frame 12 to be collapsed inward. The frame latches 72 may be spring-biased such that, upon actuation by pressing the foot bar 68, the frame latches 72 permit the frame 12 to collapse and, upon release of the foot bar 68, the frame latches 72 return to an operational position. Turning back to FIGS. 13A-16B, as the frame 12 is collapsed, brakes for the rear wheels 14 may be actuated to prevent the stroller 110 from rolling. In a third step, shown in FIGS. 15A-15B, the stroller 110 is pivoted about the rear wheels 14 and laid down. In a fourth step, shown in FIGS. 16A-16B, the handle 30 is pivoted back against the respective lengths of the side members 22. Optionally, the platform 18 may also include a hinge or joint in the midsection thereof so that the platform 18 may be folded or pivoted to occupy less space. As shown in FIGS. 16A-16B, the stroller 110 is more ably suited to storage or traveling when collapsed.

FIGS. 17-19 are photographic illustrations of an embodiment of a stroller in accordance with one or more aspects of the present invention.

Figure 34:
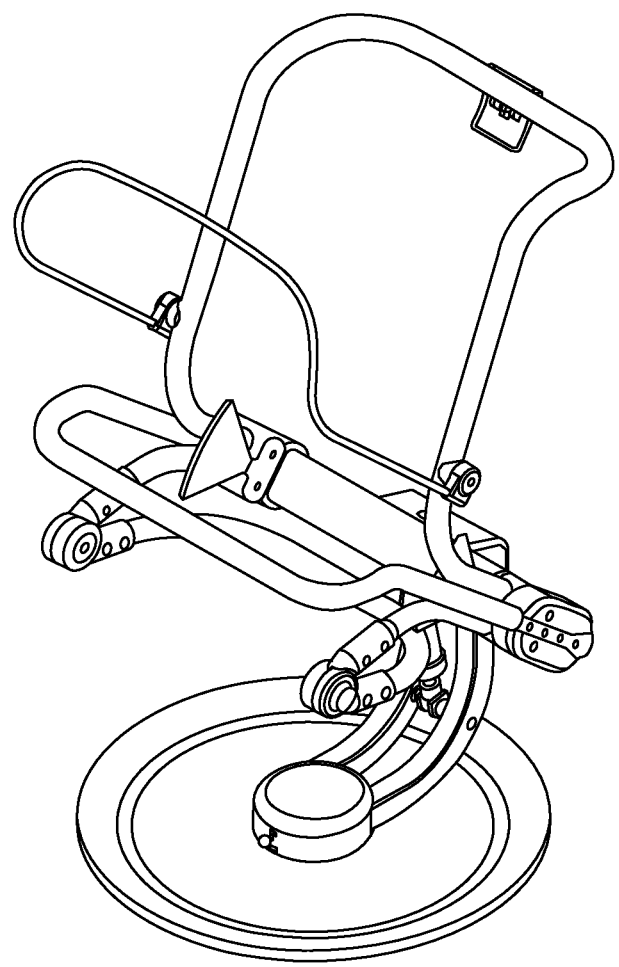
FIGS. 34 and 35 are engineering drawings, illustrating components in the form of a parts call-out listing for a stroller in accordance with one or more aspects of the present invention.
Figure 35:
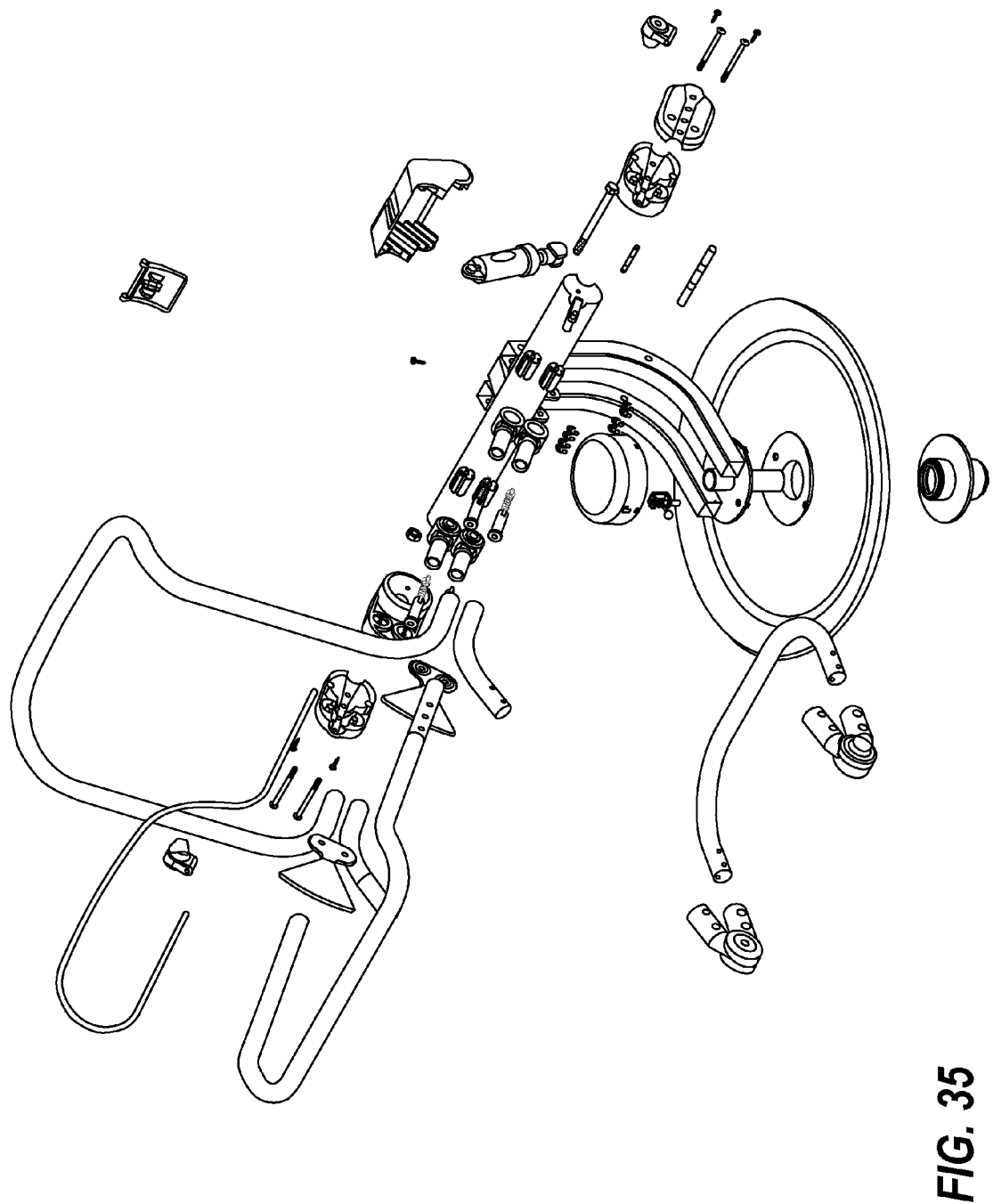

FIGS. 34-35 are engineering drawings, illustrating components in the form of a parts call-out listing for a stroller in accordance with one or more aspects of the present invention. Reference numerals or callouts identified on FIGS. 34-35 do not correspond with those identified in this description or with those provided in connection with FIGS. 1-33B. Rather, the callouts appearing on FIGS. 34-35 solely identify the various parts and components listed therein. In particular, FIGS. 34-35 depict various components discussed in greater detail above, including the platform 18, the central support 16, the tray bar 50, the seat base portion 26, the seat back portion 28, the lower leg portion 48, and the seat crossbar 44.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A stroller for carrying a child in a plurality of configurations, comprising:
   (a) a frame including a frame base defining forward and rearward portions and at least two side members attached at opposite sides of the frame base;
   (b) a plurality of wheels connected to the frame;
   (c) a lower support assembly supported by the frame base, the lower support assembly including a central support member and a platform;
   (d) a seat carried by the central support member generally above the platform at a crossbar, the seat including a base portion and a back portion and configured for selective rotation, relative to the frame base, about an axis of rotation generally perpendicular to an upper surface of the platform, wherein the seat is adapted to be selectively reconfigurable between a seated configuration and a standing configuration; and
   (e) a shock absorber for dampening motion of the seat relative to the platform;
   (f) wherein the frame base and central support member are foldable toward the side members to collapse the stroller; and
   (g) wherein:
      (i) in the seated configuration, the base portion is arranged in generally parallel relationship with the platform and the back portion is arranged to be generally upright; and
      (ii) in the standing configuration, the base portion is pivoted downward to permit a child to stand on the upper surface of the platform.

2. The stroller of claim 1, wherein the central support member has a generally arcuate shape.

3. The stroller of claim 1, wherein the central support member is generally L-shaped.

4. The stroller of claim 1, wherein the platform folds at a midsection when the stroller is collapsed.

5. The stroller of claim 1, wherein the seat is rotatable while in either of the seated configuration or the standing configuration.

6. The stroller of claim 1, wherein the seat is further adapted to be selectively reconfigurable to a reclined position, whereby the base portion is arranged in a generally parallel relationship with the platform and the back portion is reclined.

7. The stroller of claim 1, further comprising a tray bar attached at connection zones located at opposite ends of the crossbar, wherein the tray bar is rotatable with the seat.

8. The stroller of claim 7, wherein the tray bar is configured for telescoping adjustment outwardly and inwardly, relative to the seat, to accommodate children of varying sizes.

9. The stroller of claim 7, wherein the tray bar is adapted to receive a child amusement device by attachment thereto.

10. The stroller of claim 1, wherein the seat further includes a lower leg portion attachable at an end of the base portion and outwardly pivotable, relative to the base portion, to provide a child with lower leg support.

11. The stroller of claim 1, wherein an upper surface of the platform is textured to prevent a child standing thereon from slipping.

* * * * *